(12) United States Patent
Hu et al.

(10) Patent No.: US 11,237,341 B2
(45) Date of Patent: Feb. 1, 2022

(54) MODULAR HARDENED OPTICAL FIBER CONNECTOR AND ASSEMBLY METHOD THEREOF

(71) Applicant: COMMSCOPE TECHNOLOGIES LLC, Hickory, NC (US)

(72) Inventors: Guanpeng Hu, Shanghai (CN); Liming Wang, Shanghai (CN); Jianfeng Jin, Shanghai (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/978,457

(22) PCT Filed: Mar. 5, 2019

(86) PCT No.: PCT/US2019/020767
§ 371 (c)(1),
(2) Date: Sep. 4, 2020

(87) PCT Pub. No.: WO2019/173350
PCT Pub. Date: Sep. 12, 2019

(65) Prior Publication Data
US 2021/0041635 A1     Feb. 11, 2021

(30) Foreign Application Priority Data

Mar. 6, 2018   (CN) .................. CN201810180824.X
Mar. 6, 2018   (CN) .................... CN201820302402.0

(51) Int. Cl.
*G02B 6/38*   (2006.01)
*G02B 6/255*  (2006.01)

(52) U.S. Cl.
CPC ......... *G02B 6/3846* (2013.01); *G02B 6/3869* (2013.01); *G02B 6/255* (2013.01);
(Continued)

(58) Field of Classification Search
None
See application file for complete search history.

(56) References Cited

U.S. PATENT DOCUMENTS 7,568,844 B2   8/2009  Luther et al.
8,740,479 B2   6/2014  Shitama et al.
(Continued)

FOREIGN PATENT DOCUMENTS

WO         2019/089538 A1     5/2019

OTHER PUBLICATIONS

International Search Report and Written Opinion of the International Searching Authority for International Patent Application No. PCT/US2019/020767 dated Jun. 19, 2019, 15 pages.

(Continued)

*Primary Examiner* — Jerry Rahll
(74) *Attorney, Agent, or Firm* — Merchant & Gould P.C.

(57) ABSTRACT

The present disclosure discloses a modular hardened optical fiber connector and an assembly method thereof. The modular hardened optical fiber connector comprises: a ferrule stub module which comprises a pre-installed optical fiber; an optical cable holding module which comprises an optical drop fiber of an optical drop cable; an optical fiber protection module which is arranged around a connection portion between the pre-installed optical fiber and the optical drop fiber; an inner housing module which accommodates the ferrule stub module, the optical cable holding module and the optical fiber protection module therein; and an outer housing module which accommodates the inner housing module therein.

33 Claims, 18 Drawing Sheets

(52) U.S. Cl.
CPC .......... *G02B 6/3816* (2013.01); *G02B 6/3849* (2013.01); *G02B 6/3889* (2013.01)

(56) References Cited

U.S. PATENT DOCUMENTS

| | | |
|---|---|---|
| 10,180,541 B2 | 1/2019 | Coenegracht et al. |
| 10,209,459 B2 | 2/2019 | Wang et al. |
| 10,345,536 B2 | 7/2019 | Shao et al. |
| 2003/0152333 A1 | 8/2003 | Gilligan |
| 2010/0266244 A1 | 10/2010 | Lu et al. |
| 2010/0284653 A1 | 11/2010 | Tamekuni et al. |
| 2015/0277075 A1 | 10/2015 | Abernathy et al. |
| 2017/0322379 A1 | 11/2017 | De Jong et al. |

OTHER PUBLICATIONS

Extended European Search Report for European Patent Application No. 19764478.4 dated Oct. 26, 2021, 7 pages.

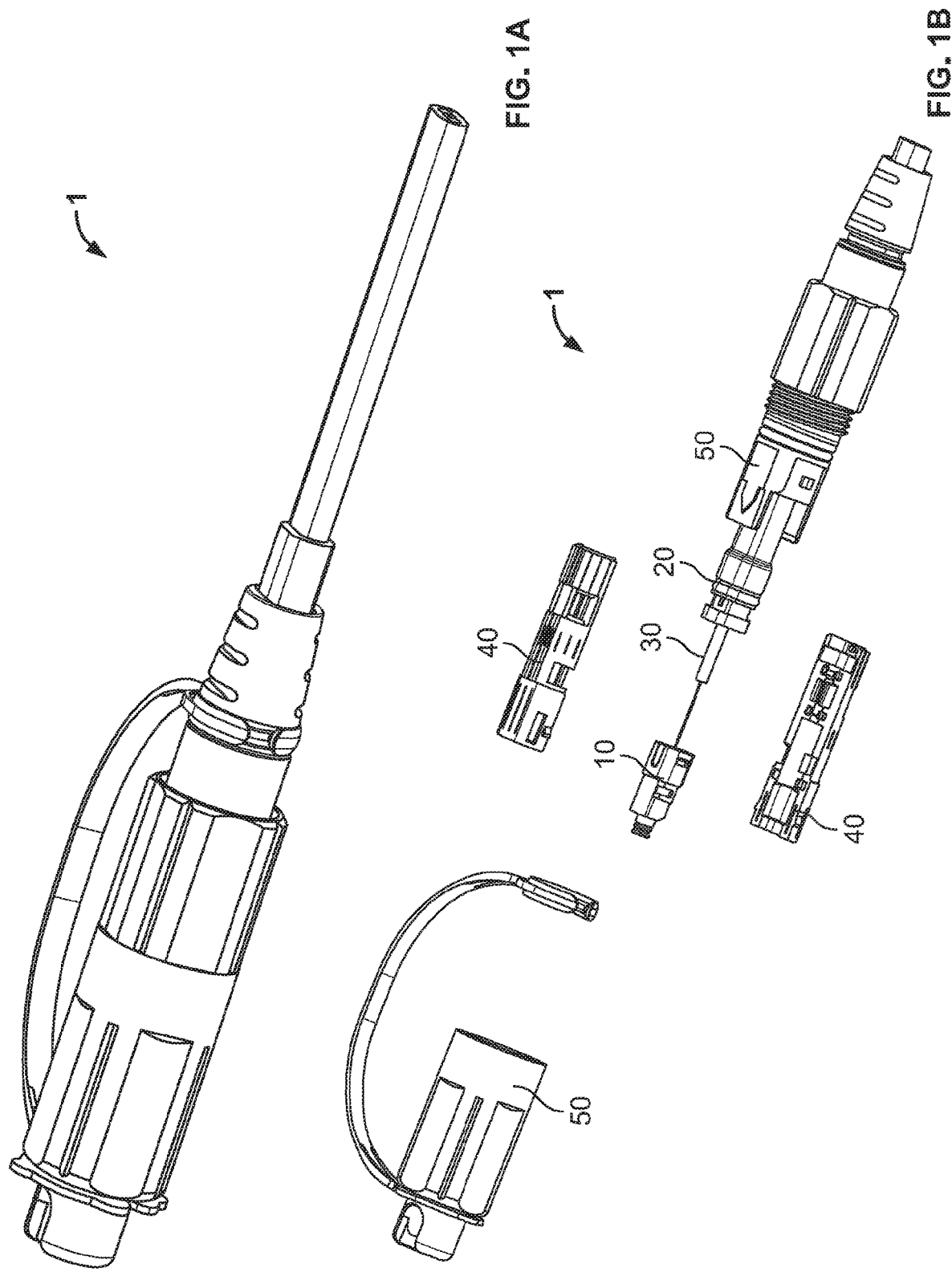

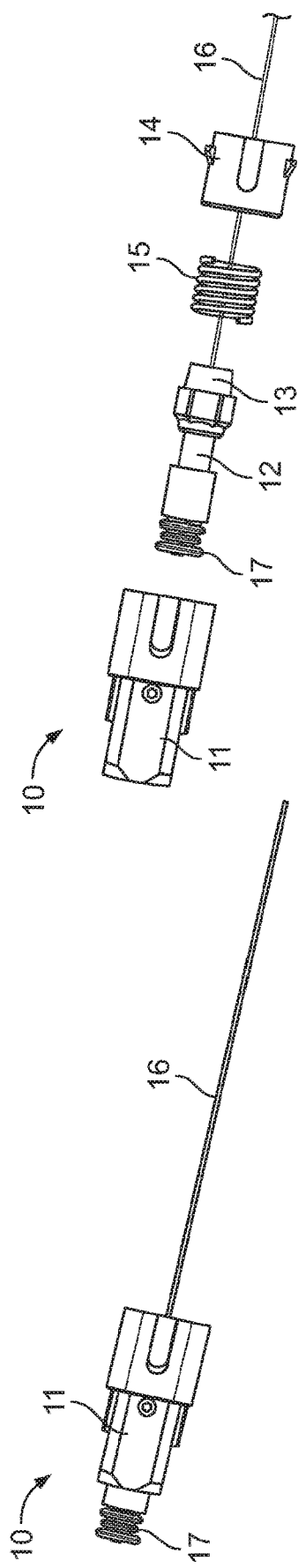
FIG. 2A
FIG. 2B
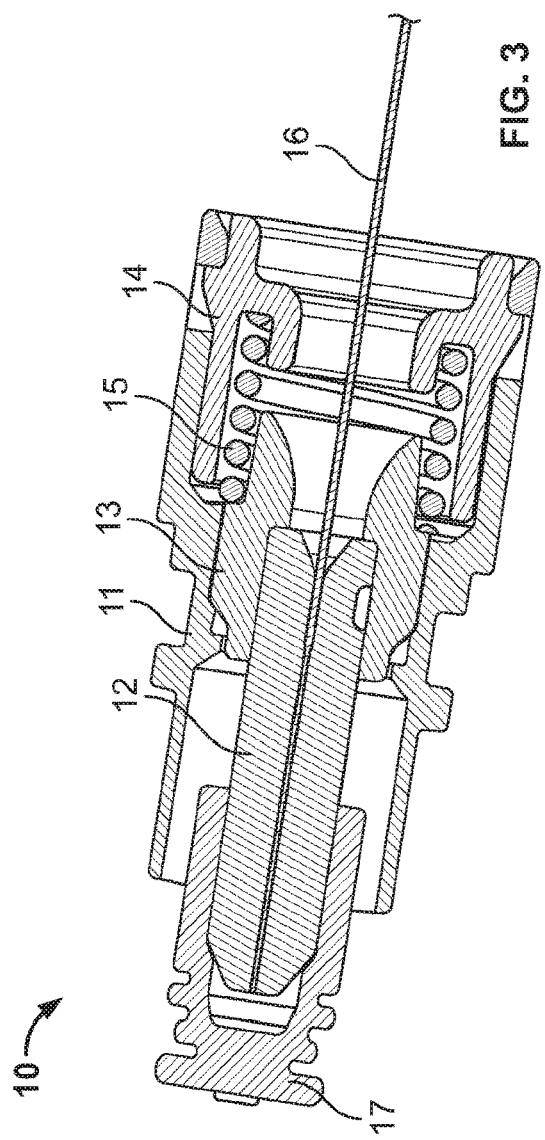
FIG. 3

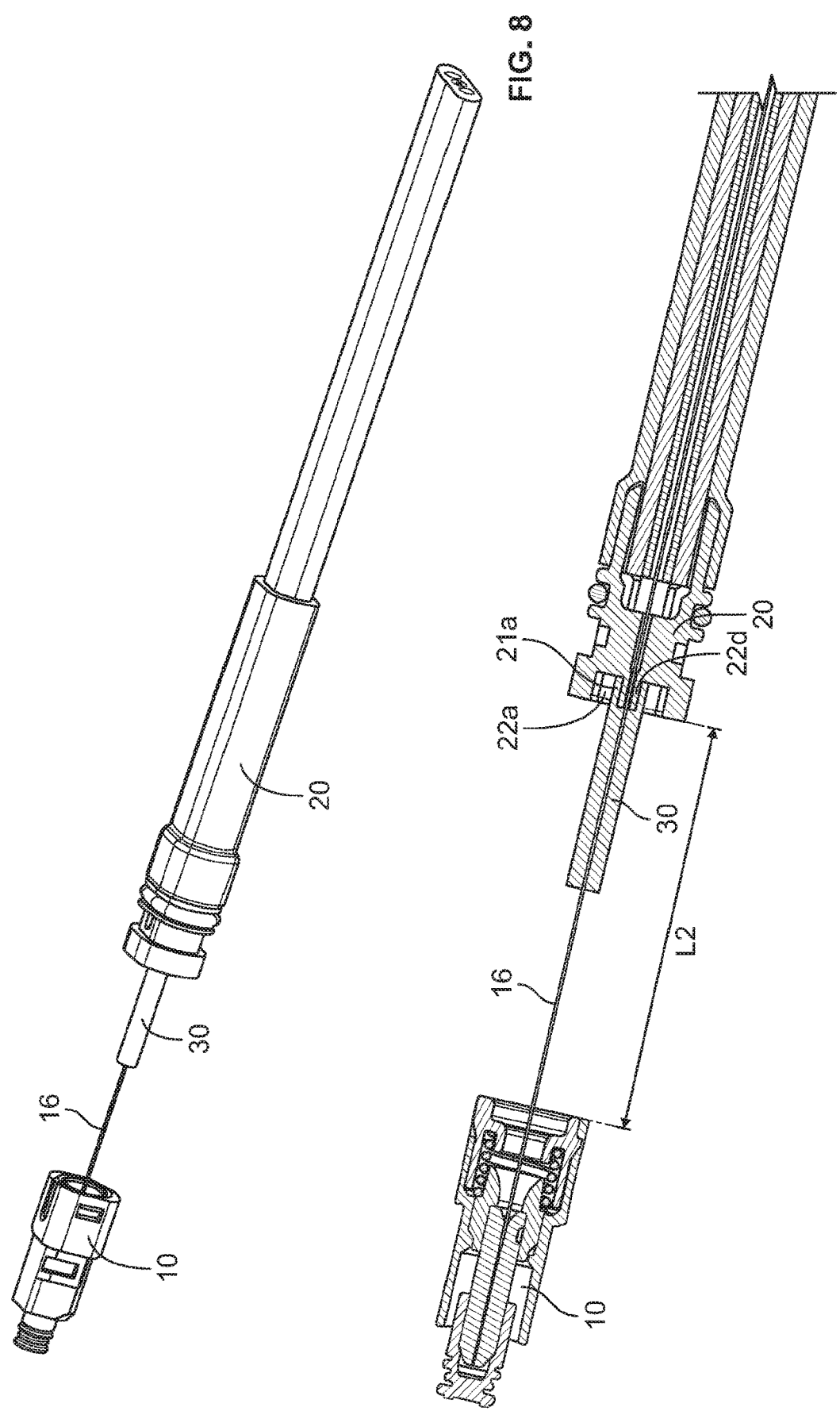

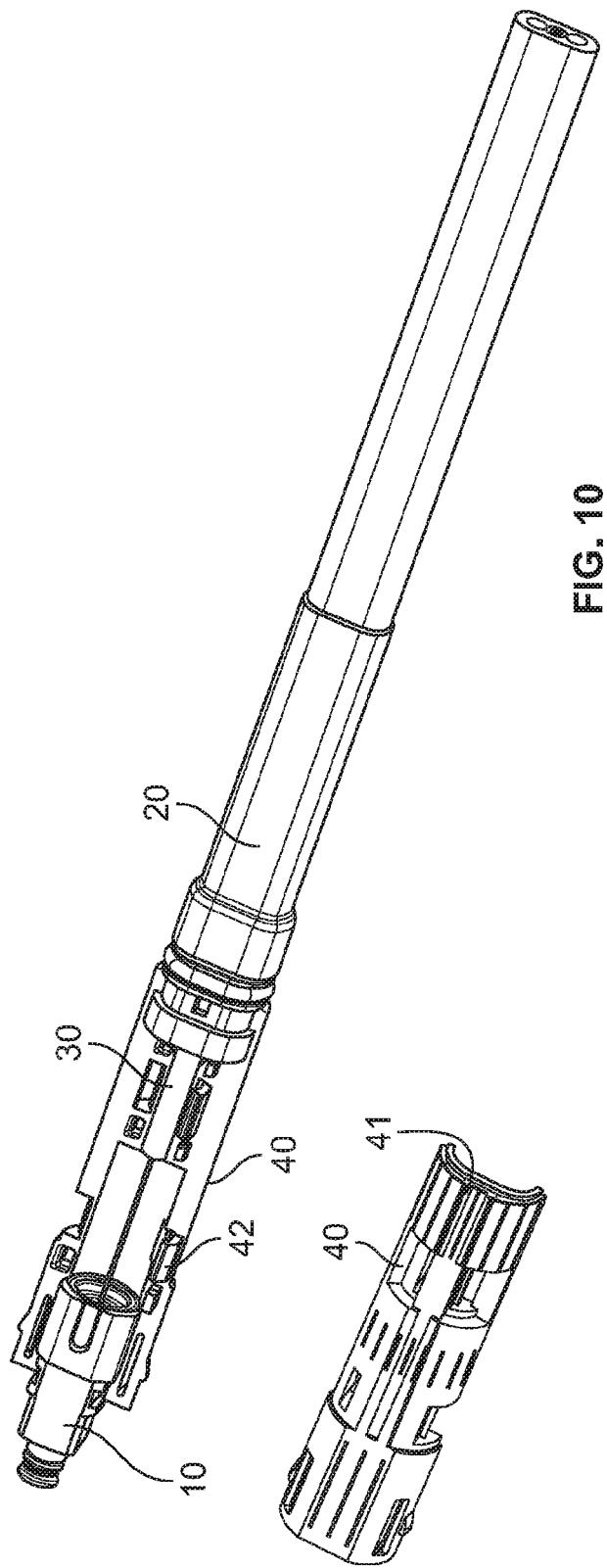

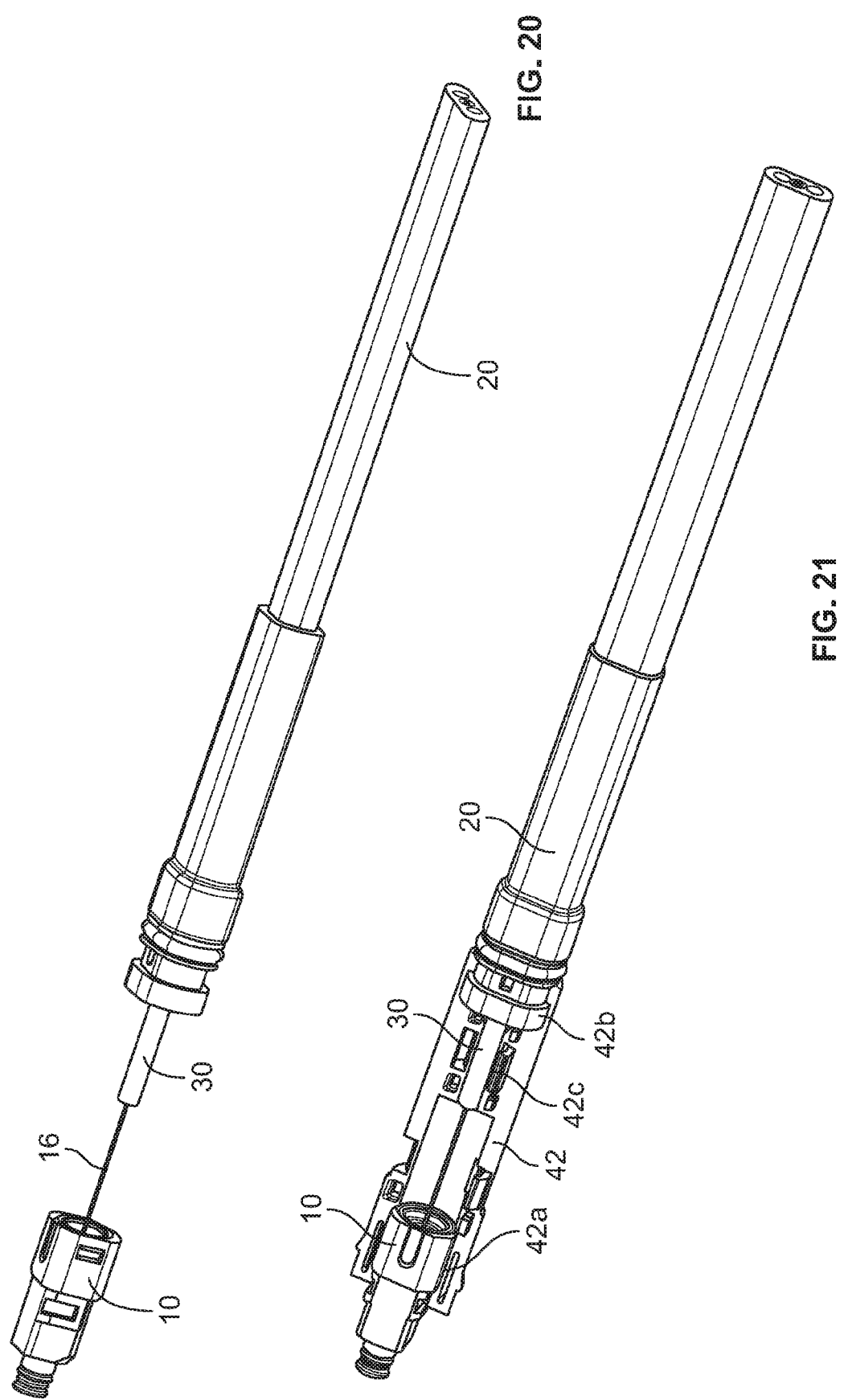

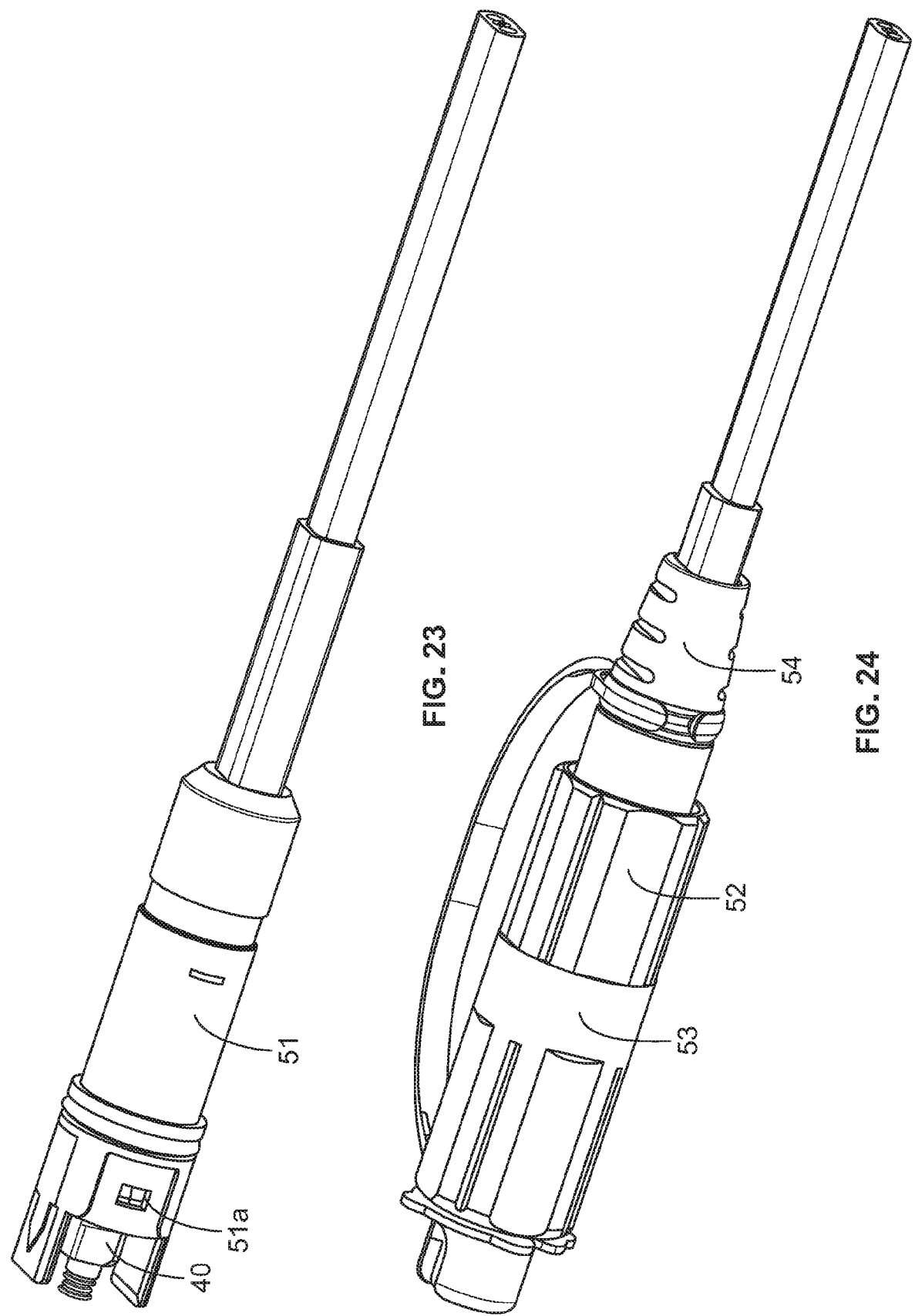

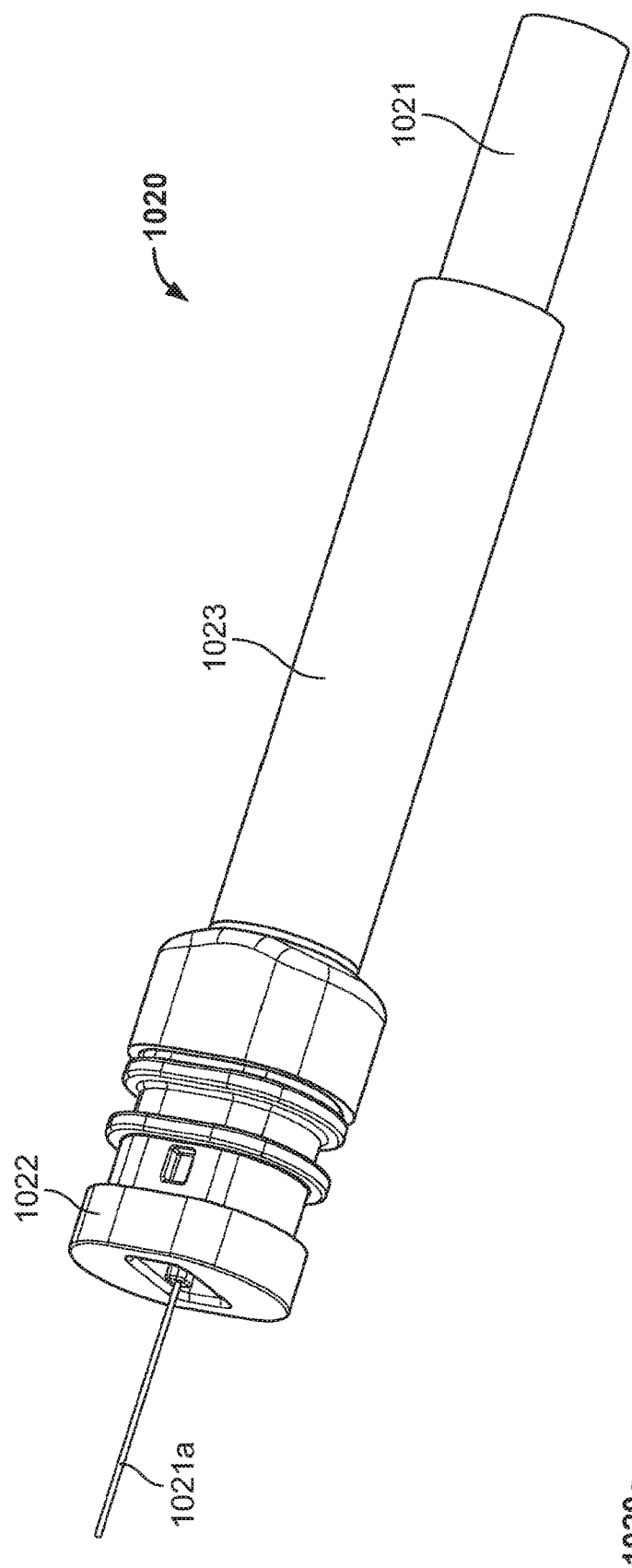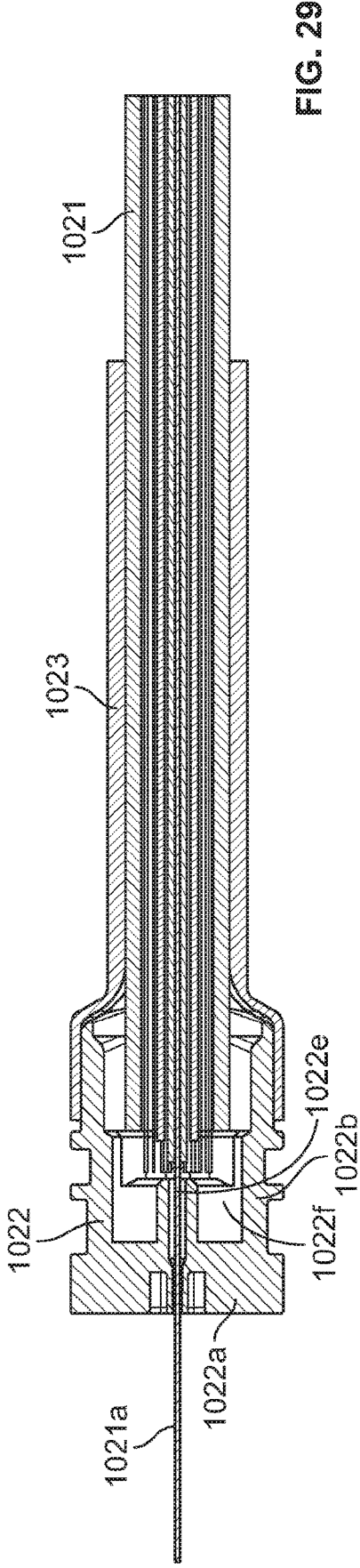

MODULAR HARDENED OPTICAL FIBER CONNECTOR AND ASSEMBLY METHOD THEREOF

CROSS-REFERENCE TO RELATED APPLICATIONS

This application is a National Stage Application of PCT/US2019/020767, filed on Mar. 5, 2019, which claims the benefit of Chinese Patent Application No. 201810180824.X, filed on Mar. 6, 2018, and claims the benefit of Chinese Patent Application No. 201820302402.0, filed on Mar. 6, 2018, the disclosures of which are incorporated herein by reference in their entireties. To the extent appropriate, a claim of priority is made to each of the above disclosed applications.

FIELD OF THE INVENTION

The present disclosure generally relates the field of optical fiber connectors. More specifically, the present disclosure relates to a modular hardened optical fiber connector and an assembly method thereof.

DESCRIPTION OF RELATED ART

Optical fiber communication networks are widely used to transmit audio, video, data and other signals. In optical fiber communication networks, optical cables are the main carrier for transmitting signals. Optical fiber connectors are used to achieve continuation between optical fibers of the optical cables. Optical fiber connectors allow connecting two optical fibers quickly, and also can be used for connecting the optical fibers to various active and passive devices. Various types of optical cables are currently available in the market, such as flat optical cable, round optical cable, bow-type optical cable and the like. Different types of optical cables have different dimensions, shapes and structures, and thereby the applicable optical fiber connectors also have different dimensions, shapes and structures. The assembly line of optical fiber connectors is faced with different types of optical fiber connectors, and each type of optical fiber connector needs a different complicated assembly process, which not only poses a great challenge to the skills of operators and reduces the manufacture efficiency, but also needs to redesign and test a new connector and build a new assembly line when a new type of optical cable is introduced, thereby prolonging the product development cycle and increasing the investment cost.

SUMMARY OF THE INVENTION

One of the objects of the present disclosure is to provide a hardened optical fiber connector and an assembly method thereof that can overcome at least one shortcomings in the prior art.

According to a first aspect of the present disclosure, a modular hardened optical fiber connector, comprises: a ferrule stub module which comprises a pre-installed optical fiber; an optical cable holding module which comprises an optical drop fiber of an optical drop cable; an optical fiber protection module which is arranged around a connection portion between the pre-installed optical fiber and the optical drop fiber; an inner housing module which accommodates the ferrule stub module, the optical cable holding module, and the optical fiber protection module therein; and an outer housing module which accommodates the inner housing module therein.

Preferably, the ferrule stub module comprises a hollow body and a ferrule arranged in the body, and the pre-installed optical fiber is inserted and bonded into the central hole of the ferrule and extends from a rear end of the ferrule out of the ferrule stub module.

Preferably, the optical cable holding module comprises an optical cable holder for holding an end of the optical drop cable, and a heat shrink sleeve enclosing a connection portion between the optical cable holder and the optical drop cable.

Preferably, the optical cable holder is a cylinder with a bottom portion at one end, which includes an inner chamber for accommodating the end of the optical drop cable and a hole at the bottom of the cylinder for passing through the optical drop fiber.

Preferably, a gap between the hole and the optical drop fiber is filled with an adhesive, so as to fix the optical drop fiber with the optical cable holder.

Preferably, a rear portion of the inner chamber accommodates a sheath of the optical drop cable, and an adhesive is filled therebetween, so as to fix the sheath of the optical drop cable with the optical cable holder.

Preferably, the front portion of the inner chamber accommodates reinforcements of the optical drop cable and an adhesive is filled therebetween, so as to fix the reinforcements of the optical drop cable with the optical cable holder.

Preferably, the intermediate portion of the inner chamber is located between the rear and front portions and accommodates a fiber sheath and/or fiber sleeve of the optical drop cable and an adhesive is filled therebetween, so as to fix the fiber sheath and/or fiber sleeve of the optical drop cable with the optical cable holder.

Preferably, the front portion of the inner chamber accommodates reinforcements, fiber sheath and/or fiber sleeve of the optical drop cable and an adhesive is filled therebetween, so as to fix the reinforcements, fiber sheath and/or fiber sleeve of the optical drop cable with the optical cable holder.

Preferably, an outer surface of the cylinder is provided with a groove to receive an O-ring, for achieving waterproof sealing between the optical cable holding module and the outer housing module.

Preferably, the heat shrink sleeve is heated to shrink on the peripheral wall of the cylinder of the optical cable holder and the sheath of the optical drop cable, to provide sealing between the optical cable holder and the optical drop cable.

Preferably, the pre-installed optical fiber of the ferrule stub module and the optical drop fiber of the optical cable holding module are connected together by means of splicing, mechanical joining or the like.

Preferably, the optical fiber protection module comprises a protective sleeve.

Preferably, the protective sleeve comprises a bonded tube, a reinforcement and a heat shrink sleeve from inside to outside.

Preferably, the protective sleeve is fixed to a projection at the front end of the optical cable holding module.

Preferably, the inner housing module includes an upper half shell and a lower half shell which are fit together.

Preferably, the upper half shell and the lower half shell are internally provided with a first upper half recess and a first lower half recess for receiving the ferrule stub module, a second upper half recess and a second lower half recess for receiving the optical cable holding module, and an upper half slot and a lower half slot for receiving the optical fiber protection module, respectively.

Preferably, the upper half shell and the lower half shell are connected together by means of adhesive, snap fit, positive fit or the like.

Preferably, the upper half shell and the lower half shell are connected together by means of an elastic snap hook and snap recess structure.

Preferably, the upper half shell and the lower half shell have the same structures.

Preferably, the upper half shell and the lower half shell are provided with ribs that slightly bulge from the outer surfaces thereof and extend longitudinally along the outer surfaces.

Preferably, both the longitudinal distance between the closest edges of the first upper half recess and the second upper half recess of the upper half shell, and the longitudinal distance between the closest edges of the first lower half recess and the second lower half recess of the lower half shell are equal to or smaller than the total length of the pre-installed optical fiber located outside the ferrule stub module and the optical drop fiber located outside the optical cable holding module.

Preferably, the outer housing module includes an outer house accommodating the inner housing module, a nut installed around the outer house onto the outer house, a shroud in threaded connection with the nut, and a stress relief boot connected to a rear part of the outer house.

Preferably, a hole is formed at the front part of the outer house; protrusions are provided at the front parts of the upper half shell and the lower half shell of the inner housing module; and the hole of the outer house cooperates with the protrusions of the upper half shell and the lower half shell to fix the inner housing module to the outer housing module.

Preferably, a first slope portion is provided at the rear part of an inner surface of the outer house, and second slope portions in contact cooperation with the first slope portion are provided at rear ends of the upper half shell and the lower half shell.

Preferably, the nut is configured to connect the outer housing module to an external network device during use of the hardened optical fiber connector.

Preferably, a front end of the stress relief boot is sleeved on the outer house, and a rear end thereof is sleeved on the sheath of the optical drop cable, to protect a connection portion between the outer housing module and the optical drop cable.

Preferably, the optical drop cable is one of flat optical cable, round optical cable and bow-type optical cable.

According to another aspect of the present disclosure, a method for assembling the hardened optical fiber connector comprises: providing a ferrule stub module comprising a pre-installed optical fiber; providing an optical cable holding module comprising an optical drop fiber of an optical drop cable; connecting the pre-installed optical fiber of the ferrule stub module and the optical drop fiber of the optical cable holding module together; providing an optical fiber protection module around a connection portion between the pre-installed optical fiber and the optical drop fiber; placing the ferrule stub module, the optical fiber protection module and the optical cable holding module into an inner housing module; and placing the inner housing module into an outer housing module.

Preferably, the method comprises, in the step of providing an optical cable holding module, inserting an end of the drop cable into an inner chamber of an optical cable holder of the optical cable holding module.

Preferably, a gap between a hole of the optical cable holder and the optical drop fiber is filled with an adhesive, so as to fix the optical drop fiber with the optical cable holder.

Preferably, a rear portion of the inner chamber accommodates a sheath of the optical drop cable, and an adhesive is filled therebetween, so as to fix the sheath of the optical drop cable with the optical cable holder.

Preferably, a front portion of the inner chamber accommodates reinforcements of the optical drop cable and an adhesive is filled therebetween, so as to fix the reinforcements of the optical drop cable with the optical cable holder.

Preferably, an intermediate portion of the inner chamber accommodates a fiber sheath and/or fiber sleeve of the optical drop cable and an adhesive is filled therebetween, so as to fix the fiber sheath and/or fiber sleeve of the optical drop cable with the optical cable holder.

Preferably, a front portion of the inner chamber accommodates reinforcements, fiber sheath and/or fiber sleeve of the optical drop cable and an adhesive is filled therebetween, so as to fix the reinforcements, fiber sheath and/or fiber sleeve of the optical drop cable with the optical cable holder.

Preferably, the method comprises, in the step of providing an optical fiber protection module around a connection portion between the pre-installed optical fiber and the optical drop fiber, fixing the optical fiber protection module to a projection at the front end of the optical cable holder of the optical cable holding module.

Preferably, the method comprises, in the step of placing the ferrule stub module, the optical fiber protection module and the optical cable holding module into the inner housing module, placing the ferrule stub module, the optical fiber protection module and the optical cable holding module into a lower half shell of the inner housing module, and fitting an upper half shell to the lower half shell.

Preferably, the method comprises placing the ferrule stub module, the optical fiber protection module and the optical cable holding module into a first lower half recess, a lower half slot and a second lower recess within the lower half shell of the inner housing module, respectively.

Preferably, the method comprises aligning guide pins and guide holes of the upper half shell and the lower half shell, and snapping an elastic snap hooks to snap recesses, thereby fitting the upper half shell and the lower half shell together.

Preferably, the method comprises, in the step of placing the inner housing module into the outer housing module, pushing the outer housing module onto the inner housing module, until protrusions on outer surfaces of the upper half shell and the lower half shell of the inner housing module are caught into holes in the outer house of the outer housing module.

Preferably, the method comprises, after the step of providing the optical fiber protection module around the connection portion between the pre-installed optical fiber and the optical drop fiber, and before the step of placing the ferrule stub module, the optical fiber protection module and the optical cable holding module into the inner housing module, selecting the inner housing module from those of different specifications.

Preferably, the method comprises measuring the total length of the pre-installed optical fiber located outside the ferrule stub module and the optical drop fiber located outside the optical cable holding module, and selecting the inner housing module such that the longitudinal distance between closest edges of a first lower half recess and a second lower half recess of the inner housing module is equal to or smaller than and closest to the total length.

BRIEF DESCRIPTION OF THE DRAWINGS

Various aspects of the present disclosure will be better understood after reading the particular embodiments in conjunction with the accompanying drawings, in which:

FIGS. 1a and 1b are an assembled perspective view and an exploded perspective view of a hardened optical fiber connector according to a first embodiment of the present disclosure;

FIGS. 2a and 2b are an assembled perspective view and an exploded perspective view of a ferrule stub module of the hardened optical fiber connector according to the first embodiment of the present disclosure;

FIG. 3 is a sectional view of the ferrule stub module of the hardened optical fiber connector according to the first embodiment of the present disclosure;

FIG. 8 is a perspective view of a protective sleeve of the hardened optical fiber connector according to the first embodiment of the present disclosure which is mounted on the spliced portion of the pre-installed optical fiber of the ferrule stub module and the optical drop fiber of the optical cable holding module;

FIG. 9 is a sectional view of the protective sleeve of the hardened optical fiber connector according to the first embodiment of the present disclosure which is mounted on the spliced portion of the pre-installed optical fiber of the ferrule stub module and the optical drop fiber of the optical cable holding module;

FIG. 10 is a perspective view of an inner housing module of the hardened optical fiber connector according to the first embodiment of the present disclosure;

FIGS. 18 to 24 are perspective views of steps of assembling the hardened optical fiber connector according to the first embodiment of the present disclosure;

FIG. 28 is a perspective view of an optical cable holding module of the hardened optical fiber connector according to the second embodiment of the present disclosure;

FIG. 29 is a sectional view of the optical cable holding module of the hardened optical fiber connector according to the second embodiment of the present disclosure;

DETAILED DESCRIPTION

Figure 4:
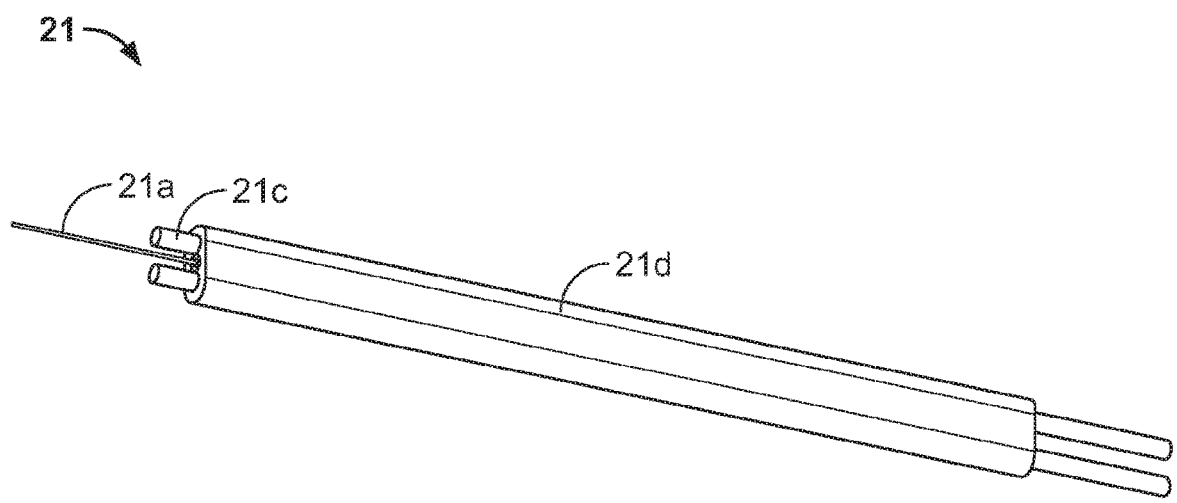
FIG. 4 is a perspective view of an optical cable for the hardened optical fiber connector according to the first embodiment of the present disclosure.

The present disclosure will be described with reference to the accompanying drawings, which show a number of embodiments of the present disclosure. It should be understood, however, the present disclosure can be embodied in various different ways, and is not limited to the embodiments described below. Rather, the embodiments described below are intended to make the disclosure of the present disclosure more complete and fully convey the protection scope of the present disclosure to those skilled in the art. It should also be understood that the embodiments disclosed herein can be combined in various manners to provide more additional embodiments.

It should be understood that like reference signs denote like elements throughout the drawings. In the drawings, the dimensions of some features can be modified for clarity.

It should be understood that terminology used herein is for the purpose of describing particular embodiments, but not intended to limit the present disclosure. All terms (including technical terms and scientific terms) used herein have meanings commonly understood by those skilled in the art unless otherwise defined. For the sake of brevity and/or clarity, well-known functions or structures may be not described in detail.

As used herein, singular forms "a", "said" and "the" include plural forms, unless explicitly indicated otherwise. The terms "comprise", "include" and "contain", as used in the specification, specify the presence of stated feature, but do not preclude the presence of one or more other features. As used herein, the term "and/or" includes any and all combinations of one or more of the associated listed items. As used herein, the phrases "between X and Y" and "between about X and Y" should be interpreted as including X and Y. As used herein, the phrase "between about X and Y" means "between about X and about Y", and as used herein, the phrase "from about X to Y" means "from about X to about Y".

In the description, when an element is described as located "on" "attached" to, "connected" to, "coupled" to or "in contact with" another element, etc., the element can be directly located on, attached to, connected to, coupled to or in contact with the other element, or there may be an intermediate element. In contrast, when an element is described as "directly" located "on", "directly attached" to, "directly connected" to, "directly coupled" to or "in direct contact with" another element, there will be no intermediate element. In the description, that one feature is arranged "adjacent" to another feature can mean that the one feature has a part overlapped with the adjacent feature or a part located above or below the adjacent feature.

In the description, spatial relation terms such as "upper", "lower", "left", "right", "front", "rear", "high", "low" and the like can indicate relationship between one feature and another feature in the drawings. It should be understood that in addition to orientations shown in the drawings, the spatial relation words also include different orientations of the device during use or operation. For example, when the device in the drawings is inverted, a feature previously described as "below" another feature can be then described as "above" another feature. The device may be oriented otherwise (rotated 90 degrees or at other orientation), and relative spatial relation will be correspondingly interpreted in this case.

The hardened optical fiber connector of the present disclosure is applicable to various types of optical cables. Referring to FIGS. 1a and 1b, the hardened optical fiber connector 1 according to the first embodiment of the present disclosure is shown with a flat optical cable as an example. As shown in FIGS. 1a and 1b, the hardened optical fiber connector 1 includes a ferrule stub module 10, an optical cable holding module 20, an optical fiber protection module 30, an inner housing module 40 and an outer housing module 50. The ferrule stub module 10, the optical cable holding module 20 and the optical fiber protection module 30 are arranged in the inner housing module 40, and the inner housing module 40 is arranged in the outer housing module 50. In the following description, the direction along the length of the hardened optical fiber connector is referred to as a longitudinal direction, and the direction perpendicular to the longitudinal direction is referred to as a transverse direction.

The ferrule stub module 10 is used to achieve optical connection with an external network device (not shown). As shown in FIGS. 2a, 2b and 3, the ferrule stub module 10 includes a hollow body 11 and a ferrule 12 arranged in the body 11. The body 11 can be a connector body having a front end with a plug interface adapted to be received within a fiber optic adapter. In one example, the front end of the body 11 can have a plug interface with the form factor of an SC connector. A rear end of the ferrule 12 is fixed to a hub 13. A hollow stopper 14 is detachably fixed to a rear end of the body 11 by means such as a snap-fit connection, and a spiral spring 15 is compressed between the hub 13 and the stopper 14. A pre-installed optical fiber 16 is inserted and bonded into the central hole of the ferrule 12 and extends from the rear end of the ferrule 12 out of the ferrule stub module 10. An interesting aspect of the ferrule stub module 10 is that when the ferrule stub module 10 is assembled, the spring 15 is pre-compressed to a compressed state that coincides with a final compressed state of the spring 15 after the connector is fully assembled. Thus, the spring 15 is retained in the pre-compressed state prior to splicing of the fiber 16 to the fiber 21a and prior to the module 10 being incorporated within the connector 1. The stopper 14 is secured to the rear end of the body 11. The spring 15 is captured within the body 11 by the stopper 14 and abuts against the hub 13 mounted on the ferrule 12 to bias the ferrule 12 in a forward direction. Thus, the spring 15 can be pre-compressed to its final compressed state by the stopper 14 prior to splicing the fiber 16 to the fiber 21a, and the stopper 14 retains the spring 15 in the final compressed state after the connector 1 is fully assembled. A dust cap 17 covers a front end of the ferrule 12 to protect the pre-installed optical fiber 16 from pollution.

Figure 5A:
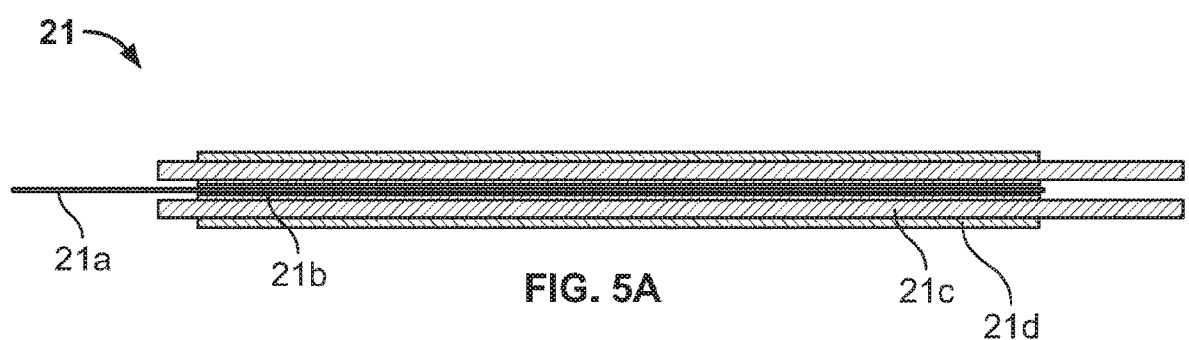
FIGS. 5a and 5b are a longitudinal sectional view and a transverse sectional view of the optical cable for the hardened optical fiber connector according to the first embodiment of the present disclosure.
Figure 5B:
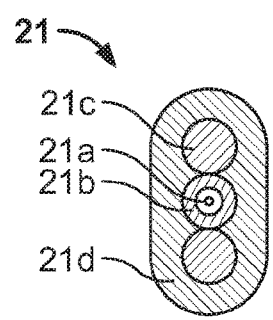

The optical cable holding module 20 is used for holding an optical drop fiber 21a of an optical drop cable 21. As shown in FIGS. 4, 5a and 5b, the optical drop cable 21 includes the optical drop fiber 21a, reinforcements 21c located on two sides of the optical drop fiber 21a, and a sheath 21d enclosing the optical drop fiber 21a and the reinforcements 21c. In some embodiments, the optical drop cable 21 further includes a fiber sleeve 21b surrounding the optical drop fiber 21a.

Figure 6:
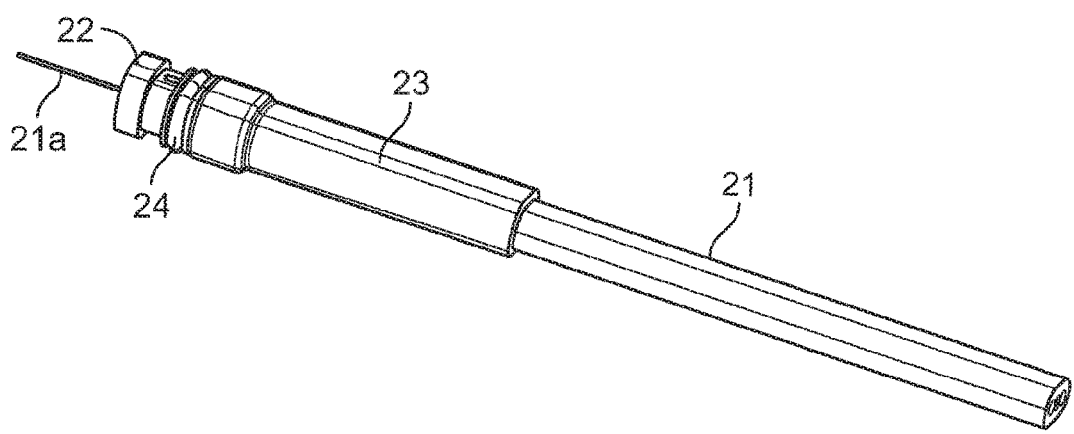
FIG. 6 is a perspective view of an optical cable holding module of the hardened optical fiber connector according to the first embodiment of the present disclosure.
Figure 7:
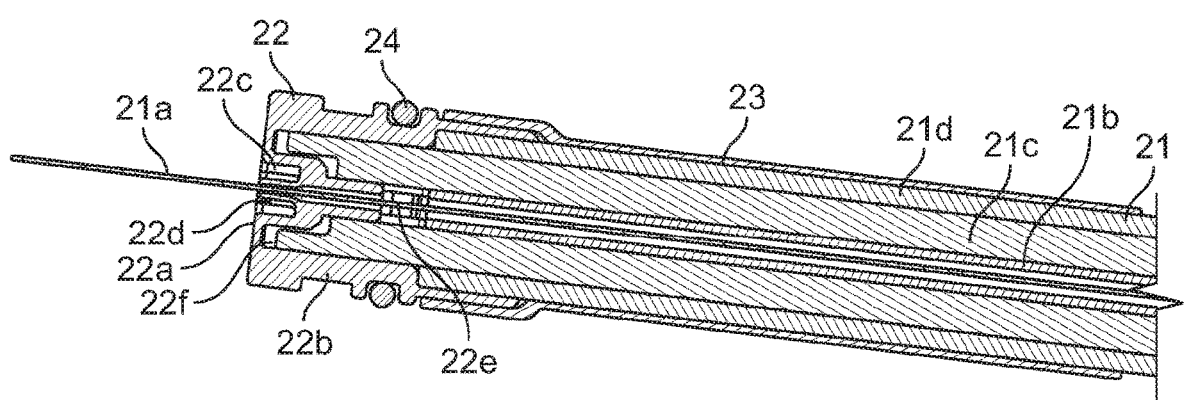
FIG. 7 is a sectional view of the optical cable holding module of the hardened optical fiber connector according to the first embodiment of the present disclosure.

As shown in FIGS. 6 and 7, the optical cable holding module 20 includes an optical cable holder 22 fixed to an end of the optical drop cable 21, and a heat shrink sleeve 23 enclosing a connection portion between the optical cable holder 22 and the optical drop cable 21. The optical cable holder 22 is a flat cylinder with a bottom portion at one end, and includes a bottom wall 22a and a peripheral wall 22b extending longitudinally from the periphery of the bottom wall 22a. An outer surface of the peripheral wall 22b is provided with a groove to receive an O-ring 24, for achieving water-proof sealing between the optical cable holding module 20 and the outer housing module 50. In the center of the bottom wall 22a, a hole 22e is provided for passing through the optical drop fiber 21a of the optical drop cable 21. As shown in FIG. 7, a length of the fiber sleeve 21b and sheath 21d is stripped off an end of the optical drop cable 21, and this end of the optical drop cable 21 is inserted into an inner chamber 22f of the optical cable holder 22 and fixed together with the optical cable holder 22 by adhesive (such as epoxy or the like). In particular, the gap between the hole 22e and the optical drop fiber 21a is filled with an adhesive, so as to fix the optical drop fiber 21a with the optical cable holder 22. The rear portion of the inner chamber 22f of the optical cable holder 22 accommodates the sheath 21d of the optical drop cable 21 and the gap therebetween is filled with an adhesive, so as to fix the sheath 21d of the optical drop cable 21 with the optical cable holder 22. The front portion of the inner chamber 22f of the optical cable holder 22 accommodates the reinforcements 21c of the optical drop cable 21 and the gap therebetween is filled with an adhesive, so as to fix the reinforcements 21c of the optical drop cable 21 with the optical cable holder 22; and the intermediate portion of the inner chamber 22f of the optical cable holder 22 accommodates the fiber sleeve 21b of the optical drop cable 21 and the gap therebetween is filled with an adhesive, so as to fix the fiber sleeve 21b of the optical drop cable 21 with the optical cable holder 22. It is important that both the optical drop fiber 21a and the reinforcements 21c are secured to the optical cable holder 22, and then the optical cable holder 22 is secured to the to the inner housing module 40 which is secured to the outer housing module 50. In this way, tensile or compressive loading from the optical drop cable 21 is prevented from being transferred to the pre-installed optical fiber 16. Instead, any loading from the reinforcements 21c or the optical drop fiber 21a is transferred through the optical cable holder 22 to the main structure of the hardened optical fiber connector 1 (which in use is typically secured within a port of an external network device such as terminal) thereby bypassing the pre-installed optical fiber 16. Thereafter, the heat shrink sleeve 23 is heated to shrink on the peripheral wall 22*b* of the optical cable holder 22 and the sheath 21*d* of the optical drop cable 21, to provide sealing between the optical cable holder 22 and the optical drop cable 21. As such, a number of structures provide sealing between the optical drop cable 21 and the connector 1 at the rear end of the connector 1. Adhesive provides sealing between the inside of the optical cable holder 22 and the optical drop cable 21. The O-ring 24 contacts an interior sealing surface of the outer house module 50 to provide sealing between an exterior surface of the optical cable holder 22 and the inside of the outer housing module 50. The heat shrink sleeve 23 can also provide sealing between the exterior of the optical drop cable 21 and the exterior of the optical cable holder 22. The front end of the optical cable holder 22 is provided with a recess 22*c*, in which a projection 22*d* is disposed around the hole 22*e*. The projection 22*d* is connected to the protective sleeve of the optical fiber protection module 30, so as to protect the connection portion between the optical drop fiber 21*a* and the optical cable holder 22.

It should be noted that for different types of cables (such as flat optical cable, round optical cable, bow-type optical cable and the like), the shapes and sizes of the applicable optical cable holders 22 can be adjusted according to the specific cable, but their general structures are substantially the same. The general structure includes the inner chamber 22*f* for accommodating the end of the drop cable 21 and the hole 22*e* at the bottom of the holder 22 for passing through the optical drop fiber 21*a*, the end of the optical drop cable 21 being fixed with the optical cable holder 22 in the inner chamber 22*f* thereof by adhesive.

As shown in FIGS. 8 and 9, the pre-installed optical fiber 16 of the ferrule stub module 10 and the optical drop fiber 21*a* of the optical cable holding module 20 are connected together by means of splicing, mechanical joining or the like, and the optical fiber protection module 30 protects the connection portion therebetween. In one embodiment, the optical fiber protection module 30 is a protective sleeve, and includes a bonded tube, a reinforcement and a heat shrink sleeve from inside to outside. As shown in FIG. 9, the protective sleeve is fixed to the projection 22*d* on the front end of the optical cable holder 22 by adhesive or the like.

Figure 11A:
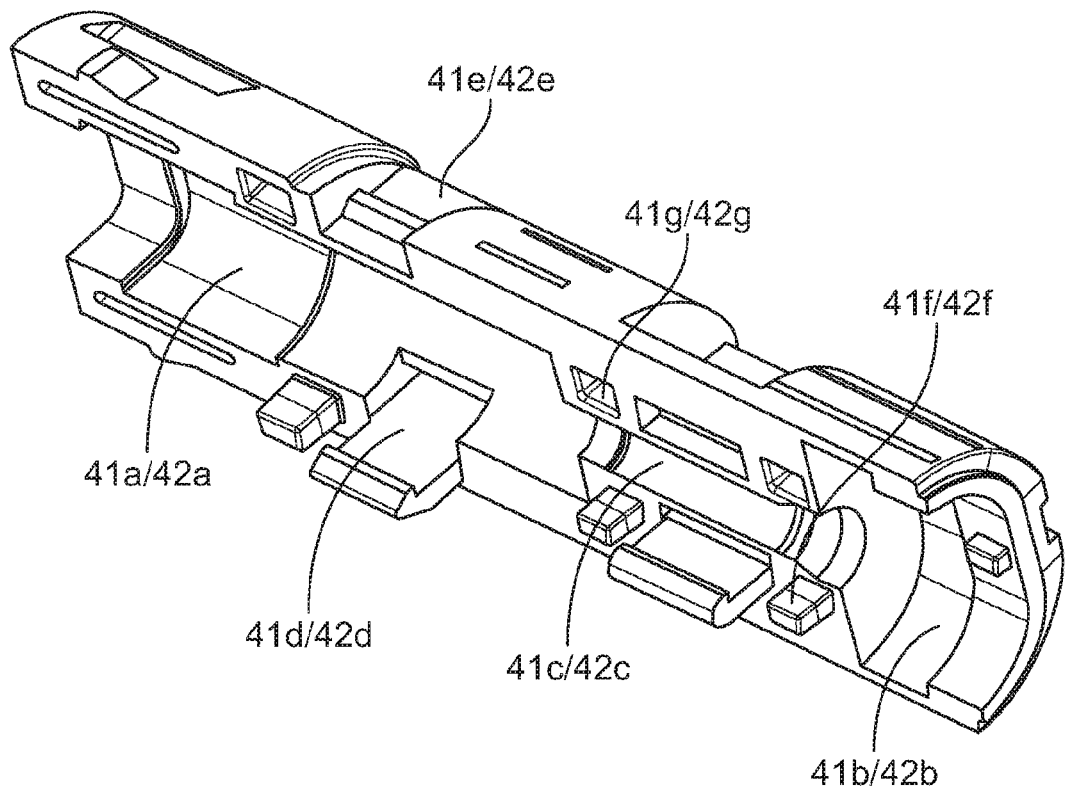
FIGS. 11a to 11c are perspective views of an inner half shell of the hardened optical fiber connector according to the first embodiment of the present disclosure.
Figure 11B:
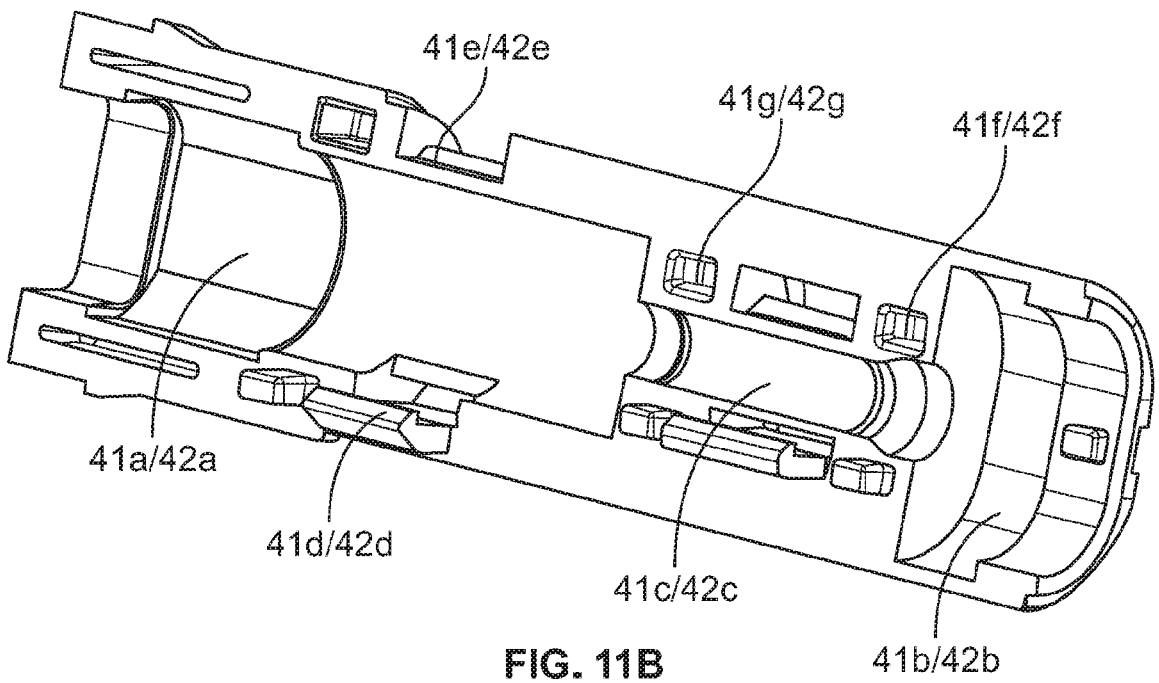
Figure 11C:
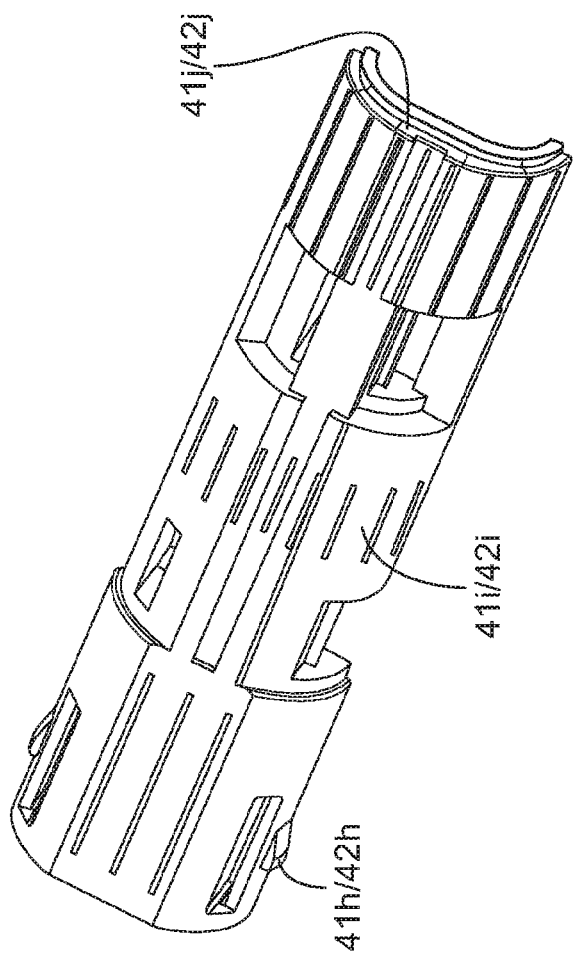

As shown in FIG. 10, the inner housing module 40 (disassembled to facilitate viewing the interior) is used for accommodating and protecting the ferrule stub module 10, the optical cable holding module 20 and the optical fiber protection module 30 which are connected together. The inner housing module 40 includes an upper half shell 41 and a lower half shell 42 which are fitted together. As shown in FIGS. 11*a* and 11*b*, the upper half shell 41 and the lower half shell 42 are internally provided with recesses 41*a* and 42*a* for receiving the ferrule stub module 10, recesses 41*b* and 42*b* for receiving the optical cable holding module 20, and slots 41*c* and 42*c* for receiving the optical fiber protection module 30. Specifically, the recesses 41*a* and 42*a* accommodate and fix a rear portion of the body 11 of the ferrule stub module 10, the recesses 41*b* and 42*b* accommodate and fix a front portion of the optical cable holder 22 of the optical cable holding module 20, and the slots 41*c* and 42*c* accommodate and fix the optical fiber protection module 30. The upper half shell 41 and the lower half shell 42 can be connected together by means of adhesive, snap fit, positive fit or the like. In one embodiment, the upper half shell 41 and the lower half shell 42 are provided with elastic snap hooks 41*d* and/or 42*d* and snap recesses 41*e* and/or 42*e* for snapping the snap hook 41*d* and/or 42*d*, to connect the upper and lower shells 41 and 42 together. In addition, the upper half shell 41 and the lower half shell 42 are provided with guide pins 41*f* and/or 42*f* and guide holes 41*g* and/or 42*g* for passing through the guide pin 41*f* and/or 42*f*, to guide the upper and lower shells into place for assembly. As shown in FIG. 11*c*, outer surfaces of the upper half shell 41 and the lower half shell 42 are provided with protrusions 41*h* and 42*h* at the front part thereof, for cooperating with a hole 51*a* (see FIGS. 15 and 16) of the outer housing module 50 to fix the inner housing module 40 to the outer housing module 50. The upper half shell 41 and the lower half shell 42 are further provided with ribs 41*i* and 42*i* that slightly bulge from the outer surfaces thereof and extend longitudinally along the outer surfaces. The ribs 41*i* and 42*i* have certain compressibility, so as to provide close fit between the inner housing module 40 and the outer housing module 50 when the inner housing module 40 is put into the outer housing module 50. The upper half shell 41 and the lower half shell 42 are further provided, at rear ends, with slope portions 41*j* and 42*j* cooperating with a corresponding slope portion 51*b* (see FIG. 14) of the outer housing module 50, which will be described below in detail. In a preferred embodiment, the upper half shell 41 and the lower half shell 42 have the same structures.

Figure 12:
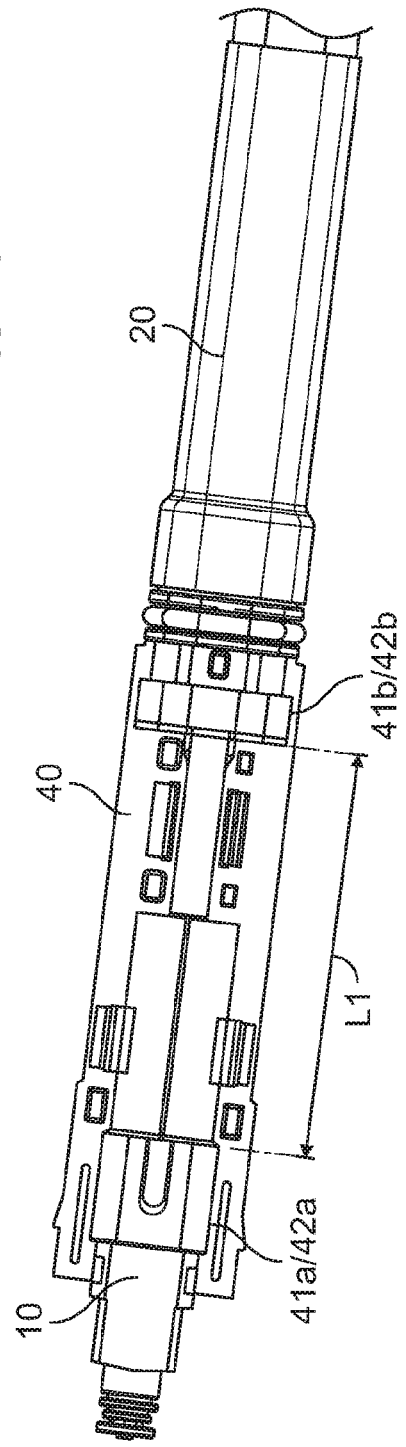
FIG. 12 is a perspective view of the ferrule stub module, the optical cable holding module and the protective sleeve, which are assembled together, of the hardened optical fiber connector according to the first embodiment of the present disclosure, in which an inner shell is removed.

As shown in FIG. 12, the longitudinal distance between the closest edges of the recess 41*a*/42*a* and the recess 41*b*/42*b* of the inner housing module 40 is L1. As shown in FIG. 9, after the pre-installed optical fiber 16 of the ferrule stub module 10 and the optical drop fiber 21*a* of the optical cable holding module 20 are connected together, the total length of the pre-installed optical fiber 16 located outside the ferrule stub module 10 and the optical drop fiber 21*a* located outside the optical cable holding module 20 is L2. During assembly of the hardened optical fiber connector 1, the inner housing module 40 should be selected such that L1 is smaller than or equal to L2, to ensure the ferrule stub module 10 and the optical cable holding module 20 can be placed into the inner housing module 40.

Figures 13A, 13B:
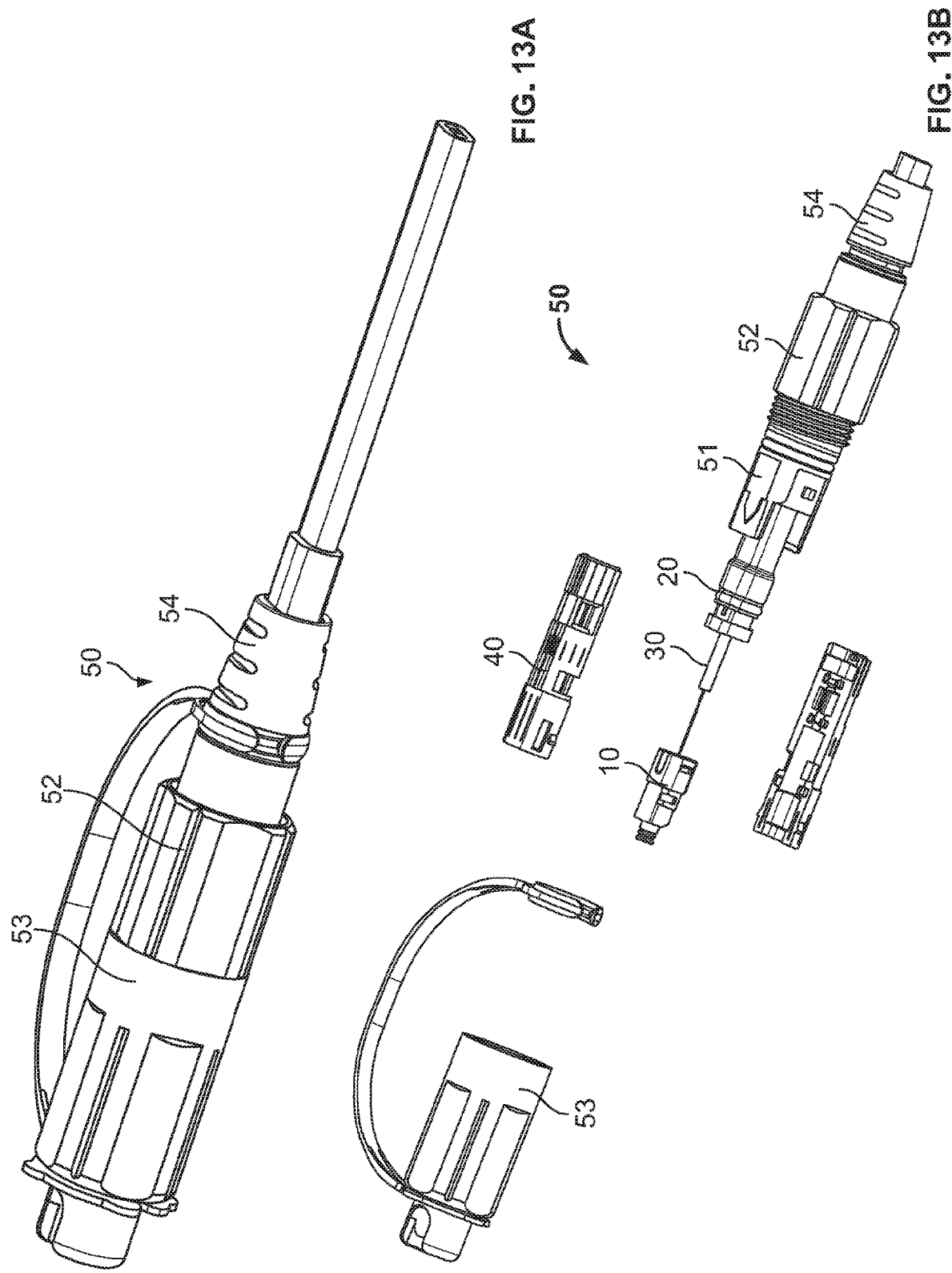
FIGS. 13a to 13b are an assembled perspective view and an exploded perspective view of an outer housing module of the hardened optical fiber connector according to the first embodiment of the present disclosure.
Figure 14:
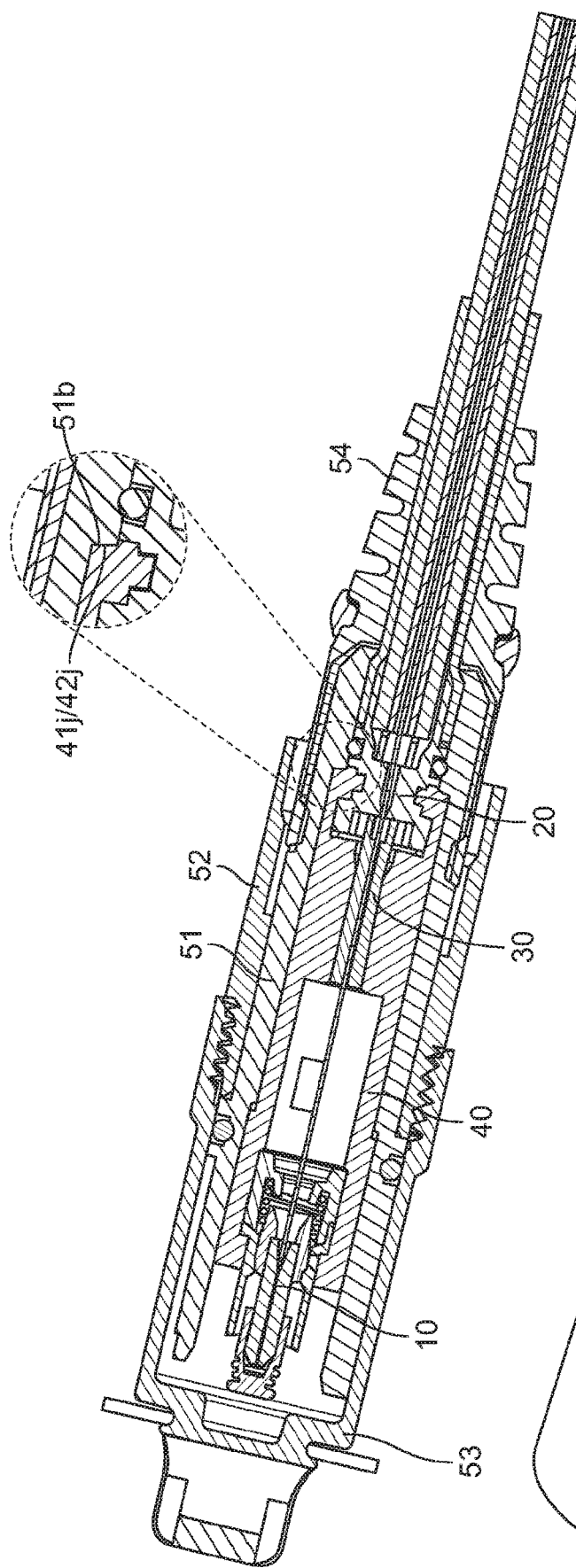
FIG. 14 is a sectional view of the outer housing module of the hardened optical fiber connector according to the first embodiment of the present disclosure.
Figure 15:
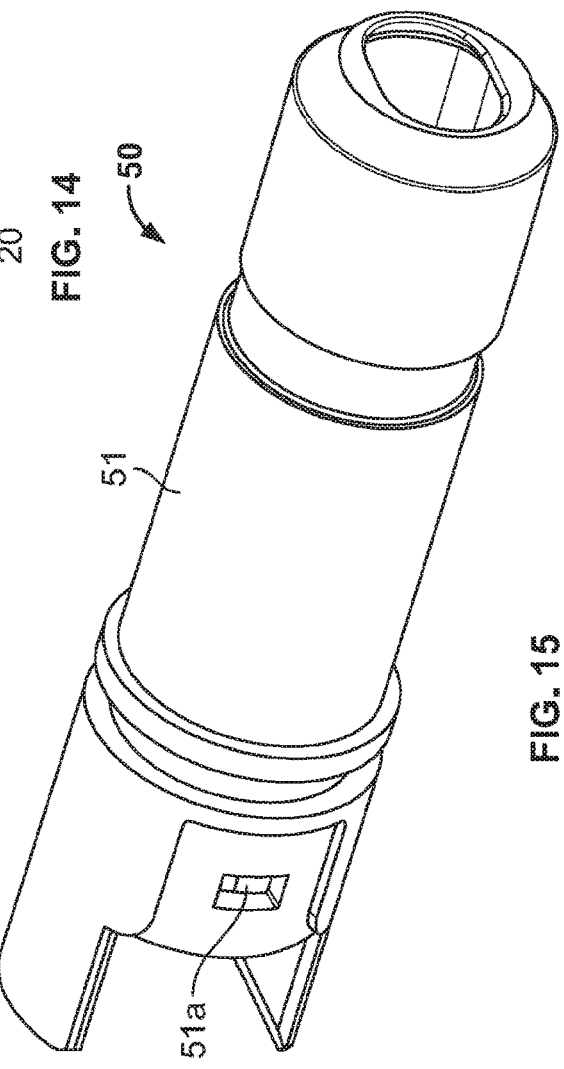
FIG. 15 is a perspective view of an outer house of the outer housing module of the hardened optical fiber connector according to the first embodiment of the present disclosure.
Figure 16:
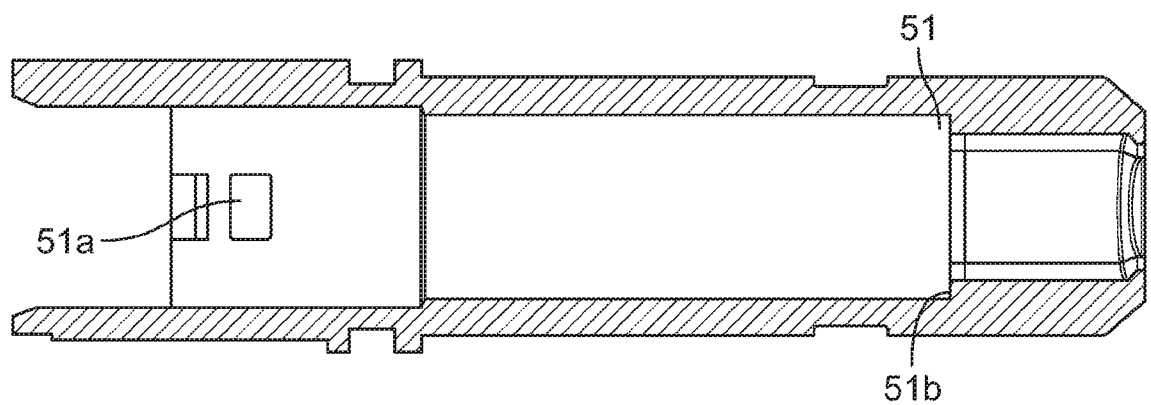
FIG. 16 is a sectional view of the outer house of the outer housing module of the hardened optical fiber connector according to the first embodiment of the present disclosure.
Figure 17:
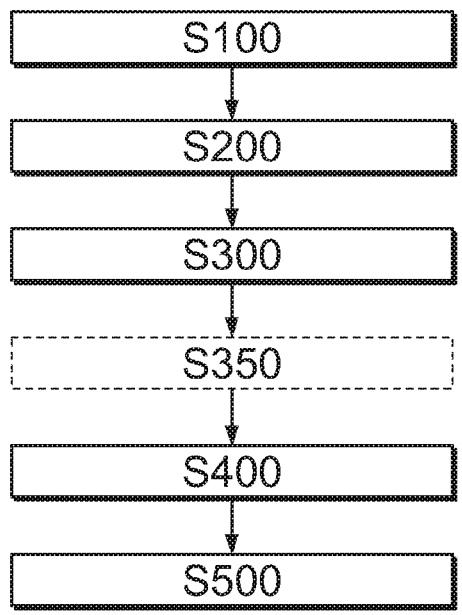
FIG. 17 is a flow diagram of assembling the hardened optical fiber connector according to the first embodiment of the present disclosure.

The outer housing module 50 is used for accommodating and protecting the ferrule stub module 10, the optical cable holding module 20, the optical fiber protection module 30 and the inner housing module 40 which are assembled together. As shown in FIGS. 13*a* and 13*b*, the outer housing module 50 includes an outer house 51 accommodating the inner housing module 40, and further includes a nut 52 around the outer house 51, a shroud 53 in threaded connection with the nut 52, and a stress relief boot 54 connected to a rear part of the outer house 51. As shown in FIGS. 14 to 16, the outer house 51 is provided with the hole 51*a* at the front part thereof, for cooperation with the protrusions 41*h* and 42*h* of the upper half shell 41 and the lower half shell 42, so as to fix the inner housing module 40 to the outer housing module 50. The rear part of an inner surface of the outer house 51 is provided with the slope portion 51*b* which is in contact cooperation with the slope portions 41*j* and 42*j* at the ends of the upper half shell 41 and the lower half shell 42. When the drop cable 21 is pulled longitudinally toward the outside of the outer house 51 and thereby the upper half shell 41 and the lower half shell 42 are moved outward, the slope portion 51*b* of the outer housing module 50 applies a transverse inward force to the slope portions 41*j* and 42*j* of the upper half shell 41 and the lower half shell 42, so that the upper half shell 41 and the lower half shell 42 are fitted to each other more closely. The nut 52 is mounted around and onto the outer house 51. Before use of the connector 1, the shroud 53 is connected to the nut 52, for protecting the ferrule stub module 10 from being exposed from the outer house 51; and during use of the connector 1, the shroud 53 is unscrewed from the nut 52, and the nut 52 is connected to the external network device. For example, the nut 52 can be threaded into an internally threaded port of the external network device to secure the outer house 51 to the external network device. The port of the network device can be a fiber optic adapter port having an alignment sleeve having a first end for receiving the body 11 of the ferrule stub module 10. The alignment sleeve can provide co-axial alignment between the body 11 and another ferrule received within an opposite second end of the alignment sleeve such that an optical connection is made between the optical fibers secured within the co-axially aligned ferrules. In other examples, an alternative fastener such as a bayonet type fastener can be used instead of the nut 52. The stress relief boot 54 is used for protecting the connection portion between the outer housing module 50 and the optical drop cable 21, and a front end of the stress relief boot 54 is sleeved on the outer house 51, and a rear end thereof is sleeved on the sheath 21*d* of the optical drop cable 21.

Figure 18:
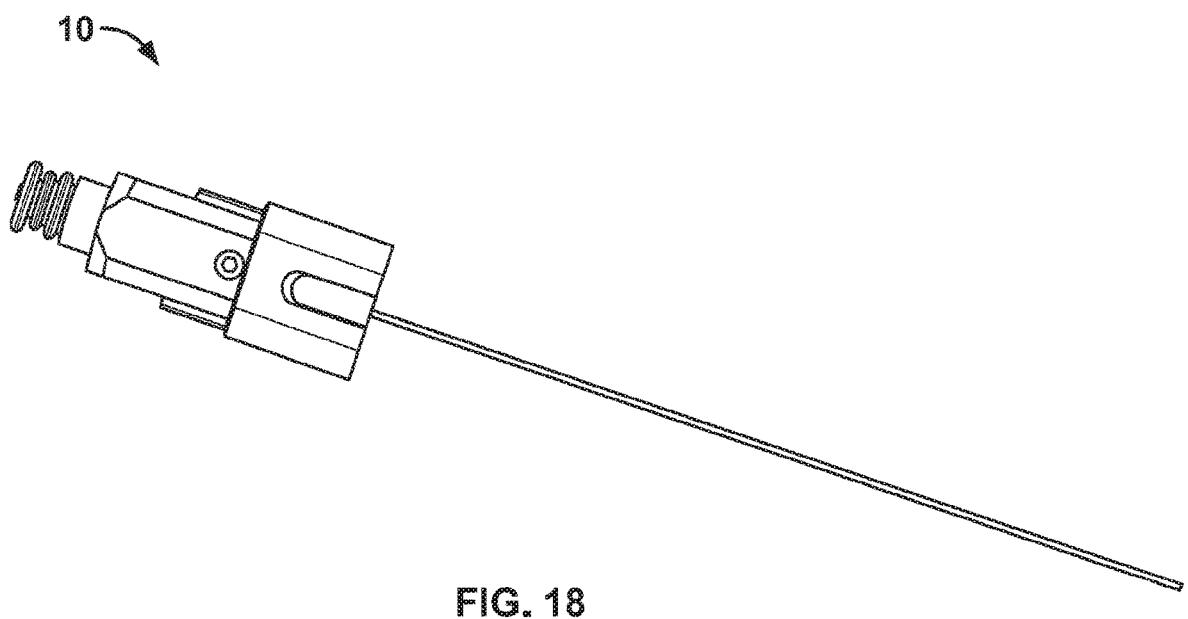
Figure 19:
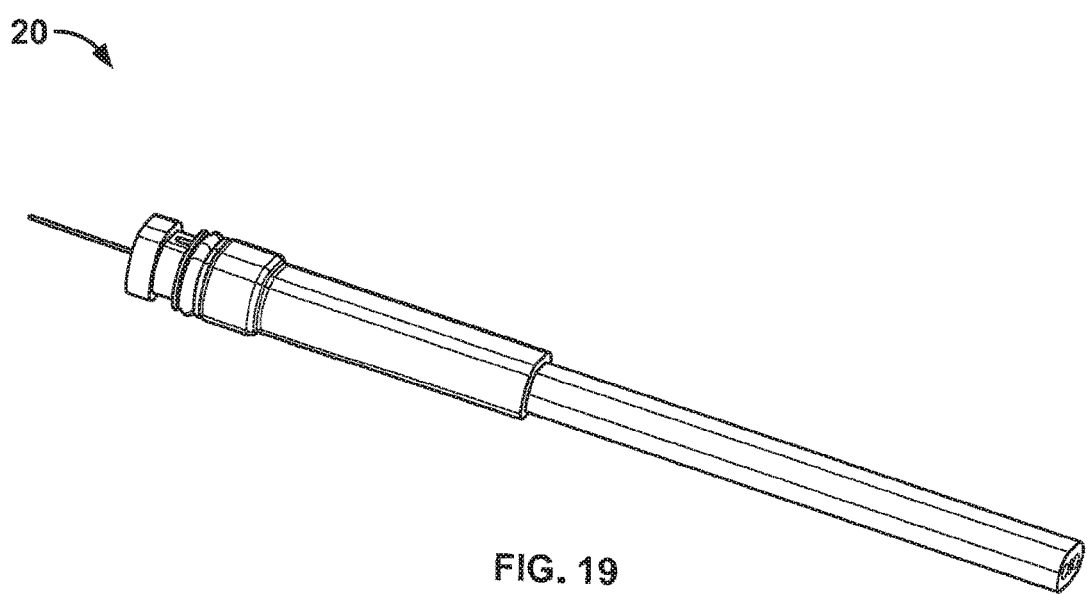
Figure 22:
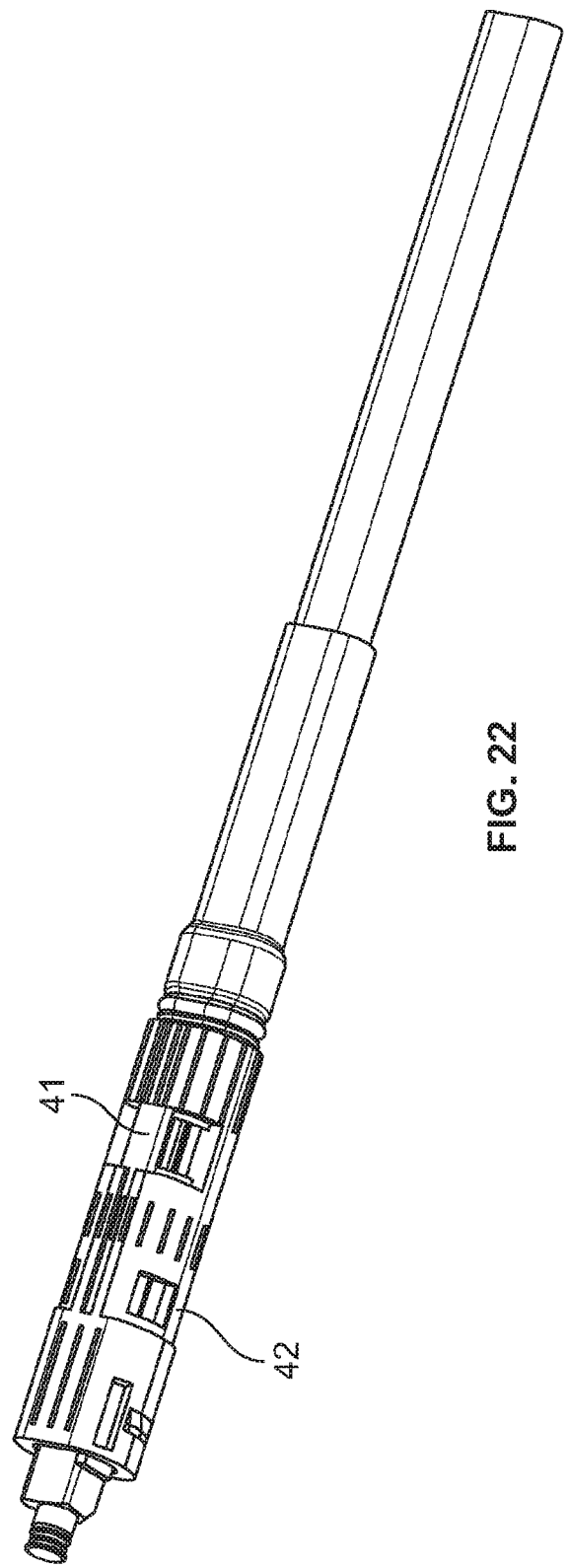

An assembly process of the hardened optical fiber connector 1 is introduced below with reference to FIGS. 17 to 24. In step S100, the ferrule stub module 10 is manufactured in batch by automatic or semi-automatic equipment, as shown in FIG. 18. The present disclosure inserts and bonds the pre-installed optical fiber 16 into the ferrule 12 by adhesive, grinds and polishes end surfaces of the ferrule stub and the pre-installed optical fiber, and inspects the pre-installed optical fiber during manufacture of the ferrule stub module 10. However, the prior art inserts and bonds the optical drop fiber of the optical drop cable to the ferrule stub during assembly of the ferrule stub module with other components of the fiber connector. As the drop cable is very long, it is difficult to realize high automation for the above processes (inserting, adhesive curing, grinding and polishing, and inspecting). The modular design of the ferrule stub module 10 of the present disclosure enables the automation for the above processes, so as to realize batch production, high efficiency and high quality. In step S200, the optical cable holding module 20 is manufactured by automatic or semi-automatic equipment, as shown in FIG. 19. Corresponding types of optical cable holders 22 can be selected for different types of optical cables. In step S300, the pre-installed optical fiber 16 of the ferrule stub module 10 and the optical drop fiber 21*a* of the optical cable holding module 20 are connected together by means of splicing, mechanical joining or the like. An optical fiber protection module 30 is arranged around the connection portion therebetween, and the protection sleeve of the optical fiber protection module 30 is fixed to the projection 22*d* of the optical cable holder 22, as shown in FIG. 20. In step S400, a rear portion of the ferrule stub module 10 is placed into the recess 42*a* of the lower half shell 42 of the inner housing module 40, a front portion of the optical cable holding module 20 is placed into the recess 42*b* of the lower half shell 42, and the optical fiber protection module 30 is placed into the slot 42*c* of the lower half shell 42, as shown in FIG. 21. The modular design of the present disclosure increases the accuracy of cut length of the pre-installed optical fiber and the optical drop fiber, and thus the fiber length L2 exposed outside keeps substantially stable, minimizing the buckling of the pre-installed optical fiber 16 and the drop optical fiber 21*a* in the half shells. Subsequently, the guide pins and the guide holes of the upper half shell 41 and the lower half shell 42 are aligned, and the elastic snap hooks are snapped onto the snap recesses, thereby assembling the two half shells together, as shown in FIG. 22. In step S500, the outer house 51 of the outer housing module 50 is pushed over the inner housing module 40, until the protrusions 41*h* and 42*h* of the inner housing module 40 are caught into the hole 51*a*, as shown in FIG. 23. Then, the nut 52 and the stress relief boot 54 are sleeved on the outer house 51, and shroud 53 is screwed into the nut 52, thus completing assemble operation of the hardened optical fiber connector 1, as shown in FIG. 24.

In a preferred embodiment, there is also step S350 between step S300 and step S400, to select the inner housing module 40 from those of different specifications. In this step which provides inner housing modules 40 with two or more lengths L1, the total length L2 of the pre-installed optical fiber 16 located outside the ferrule stub module 10 and the optical drop fiber 21*a* located outside the optical cable holding module 20 is measured by using a measuring apparatus, for selecting an inner housing module 40 whose L1 is equal to L2 or smaller than and closest to L2. Then the ferrule stub module 10, the optical cable holding module 20 and the optical fiber protection module 30 are installed into the selected inner housing module 40.

A hardened optical fiber connector 1001 according to a second embodiment of the present disclosure will be described below with reference to FIGS. 25 to 31. For the hardened optical fiber connector 1001, identical or similar structures will be denoted by reference signs for the hardened optical fiber connector 1 plus 1000.

Figure 25:
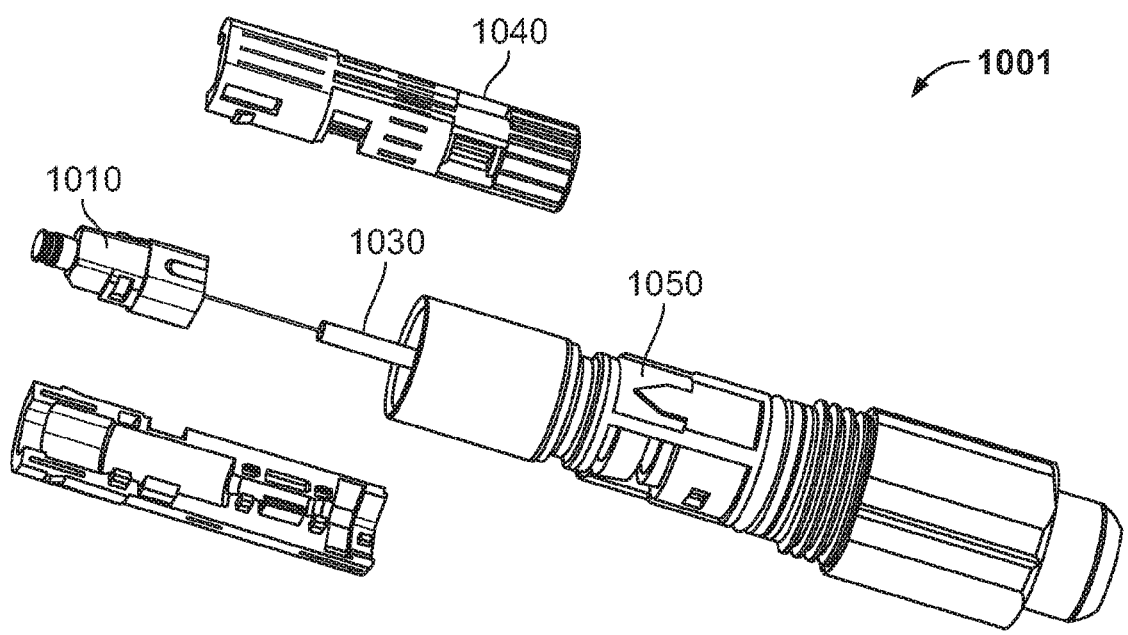
FIG. 25 is an exploded perspective view of some modules of a hardened optical fiber connector according to a second embodiment of the present disclosure.

The hardened optical fiber connector 1001 is applicable to an optical drop cable 1021 which is a round optical cable. As shown in FIG. 25 (only an outer house is shown for an outer housing module), the hardened optical fiber connector 1001 includes a ferrule stub module 1010, an optical cable holding module 1020, an optical fiber protection module 1030, an inner housing module 1040 and the outer housing module 1050. The ferrule stub module 1010, the optical cable holding module 1020 and the optical fiber protection module 1030 are arranged in the inner housing module 1040, and the inner housing module 1040 is arranged in the outer housing module 1050.

Figure 26:
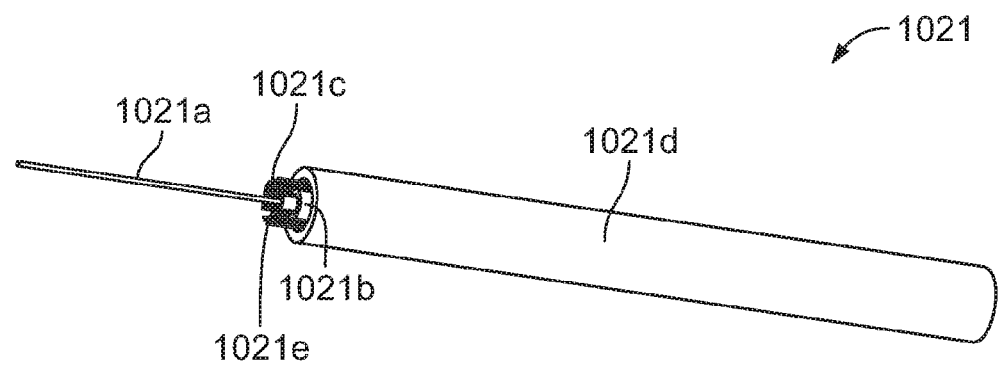
FIG. 26 is a perspective view of an optical cable for the hardened optical fiber connector according to the second embodiment of the present disclosure.
Figure 27:
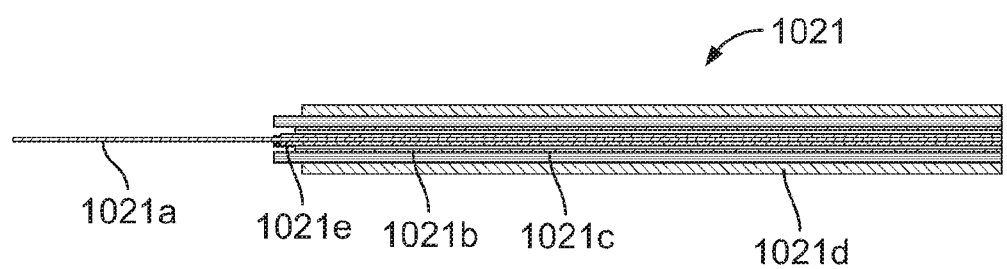
FIG. 27 is a longitudinal sectional view of the optical cable for the hardened optical fiber connector according to the second embodiment of the present disclosure.

As shown in FIGS. 26 and 27, the optical drop cable 1021 includes an optical drop fiber 1021*a*, a fiber sheath 1021*e* around the optical drop fiber, reinforcements 1021*c* around the fiber sheath 1021*e*, and a sheath 1021*d* around the reinforcements 1021*c*. In an embodiment, the optical drop cable 1021 further includes a fiber sleeve 1021*b* around the fiber sheath 1021*e* between the fiber sheath 1021*e* and the reinforcement 1021*c*. As shown in FIGS. 28 and 29, the optical cable holding module 1020 includes an optical cable holder 1022 fixed to an end of the optical drop cable 1021, and a heat shrink sleeve 1023 enclosing a connection portion between the optical cable holder 1022 and the drop optical cable 1021. The optical cable holder 1022 is a cylinder with a bottom portion at one end, and includes a bottom wall 1022*a* and a peripheral wall 1022*b* extending longitudinally from the periphery of the bottom wall 1022*a*. In the center of the bottom wall 1022*a*, a hole 1022*e* is provided for passing through the optical drop fiber 1021*a* of the optical drop cable 1021. As shown in FIG. 29, a length of the sheath 1021*d* is stripped off an end of the optical drop cable 1021, and this end of the optical drop cable 1021 is inserted into an inner chamber 1022*f* of the optical cable holder 1022 and fixed together with the optical cable holder 1022 by adhesive (such as epoxy or the like). In particular, the gap between the hole 1022*e* and the optical drop fiber 1021*a* is filled with an adhesive, so as to fix the drop optical fiber 1021*a* with the optical cable holder 1022; the rear portion of the inner chamber 1022*f* of the optical cable holder 1022 accommodates the sheath 1021d of the optical drop cable 1021 and the gap therebetween is filled with an adhesive, so as to fix the sheath 1021d of the optical drop cable 1021 with the optical cable holder 1022; the front portion of the inner chamber 1022f of the optical cable holder 1022 accommodates the reinforcements 1021c, the fiber sheath 1021e and/or the fiber sleeve 1021b of the optical drop cable 1021 and the gap therebetween is filled with an adhesive, so as to fix the reinforcements 1021c, the fiber sheath 1021e and/or the fiber sleeve 1021b of the optical drop cable 1021 with the optical cable holder 1022. After the optical drop cable 1021 is fixed to the optical cable holder 1022, the heat shrink sleeve 1023 is heated to shrink on the peripheral wall 1022b of the optical cable holder 1022 and the sheath 1021d of the optical drop cable 1021, to provide sealing between the optical cable holder 1022 and the optical drop cable 1021. As stated above, the general structure of the optical cable holder 1022 is substantially the same with that of the optical cable holder 22, and includes the inner chamber 1022f for accommodating the end of the drop cable 1021 and the hole 1022e at the bottom of the holder for passing through the optical drop fiber 1021a, the end of the optical drop cable 1021 being fixed with the optical cable holder 1022 in the inner chamber 1022f thereof by adhesive.

Figure 30:
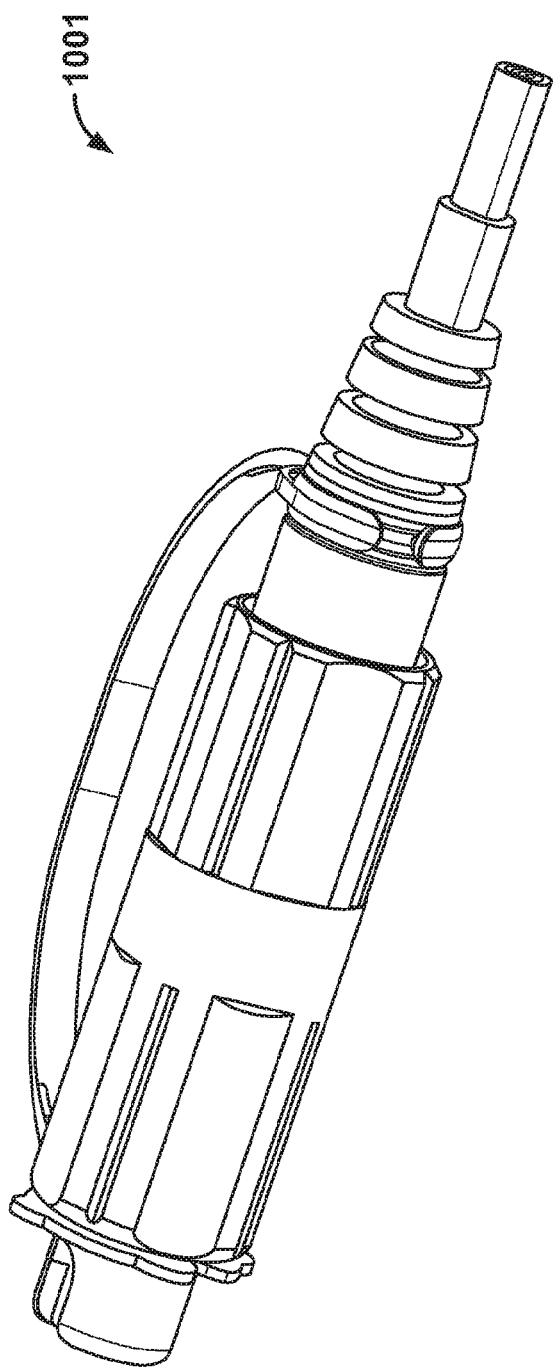
FIG. 30 is a perspective view of the hardened optical fiber connector according to the second embodiment of the present disclosure.
Figure 31:
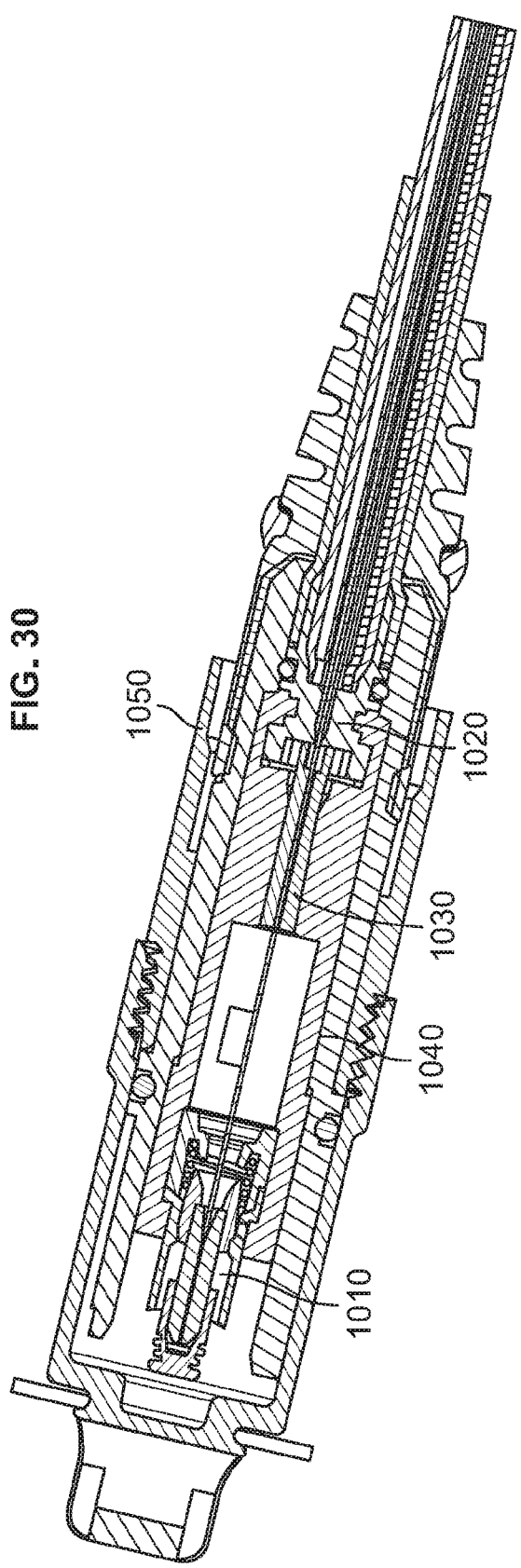
FIG. 31 is a sectional view of the hardened optical fiber connector according to the second embodiment of the present disclosure.

As shown in FIGS. 30 and 31, the ferrule stub module 1010, the optical fiber protection module 1030, the inner housing module 1040 and the outer house 1050 of the hardened optical fiber connector 1001 are substantially similar to the ferrule stub module 10, the optical fiber protection module 30, the inner housing module 40 and the outer house 50 of the hardened optical fiber connector 1 in structure, and will not be repeated.

As the hardened optical fiber connector 1001 and the hardened optical fiber connector 1 adopt the same modular structure, the assembly method of the hardened optical fiber connector 1001 is same as that of the hardened optical fiber connector 1.

According to the assembly method of the present disclosure, an operator can connect the optical cable fixed with the optical cable holder to the ferrule stub module, and uses the inner housing module to stably and firmly retain the connected components, and then easily push the outer housing module onto the inner housing module, thus completing the final assembly. For the modular hardened optical fiber connector of the present disclosure, slight adjustment is necessary only for the internal structure of the optical cable holder in order to enable the entire optical fiber connector to be applicable to different types of optical cables, without adjusting the structure of other components of the optical fiber connector and the overall assembly process of the optical fiber connector. That is to say, the optical cable holding assembly has various internal structures for accommodating different types of optical cables, but has same interfaces for connection to the main body of the optical fiber connector. Therefore, for the modular hardened optical fiber connector according to the present disclosure, the structure and assembly process of the optical fiber connector are simplified, and an operator with basic training can perform the assembly, thereby improving the manufacture efficiency, reducing the manufacture cost, and being applicable to mass production.

Although exemplary embodiments of the present disclosure are described, it should be understood by those skilled in the art that various modifications and changes can be made to the exemplary embodiments of the present disclosure without essentially departing from the spirit and scope of the present disclosure. Thus, all the modifications and changes are encompassed within the protection scope of the present disclosure defined by the claims. The present disclosure is defined by the appended claims, and equivalents of the claims are also included therein.

ASPECTS OF THE DISCLOSURE

Aspect 1. A system for terminating an optical drop cable, the system comprising:
  a cable holder module configured to receive the optical drop cable;
  a ferrule stub module configured to carry an optical stub fiber, the ferrule stub module also including a ferrule and a spring, the ferrule stub module pre-compressing the spring to bias the ferrule away from the cable holder module; and
  a hardened connector body that mounts about the cable holder module and the ferrule stub module.

Aspect 2. The system of aspect 1, wherein the hardened connector body includes an inner housing and an outer housing that mounts around the inner housing.

Aspect 3. The system of aspect 2, wherein the outer housing includes multiple pieces that snap around the inner housing.

Aspect 4. The system of aspect 2 or 3, wherein the inner housing includes multiple pieces that are assembled around the cable holder module and the ferrule stub module.

Aspect 5. The system of any of aspects 1-4, further comprising a protection module that extends from the cable holder module towards the ferrule stub module, the protection module being disposed within the hardened connector body.

Aspect 6. The system of any of aspects 1-5, further comprising an optical stub fiber that extends between a first end and a second end, the first end being affixed to the ferrule of the ferrule stub module, the second end being spaced from the ferrule stub module.

Aspect 7. The system of aspect 6, further comprising an optical drop cable including an optical drop fiber and reinforcements, the optical drop fiber extending through the cable holding module towards the ferrule stub module, the reinforcements being anchored to the cable holder module.

Aspect 8. The system of aspect 7, wherein the optical drop fiber is spliced to the optical stub fiber.

Aspect 9. The system of aspect 8, and preferably aspects 1, 5, 6, 7, and 8, wherein the protection module is mounted about the splice between the optical drop fiber and the optical stub fiber.

Aspect 10. The system of any of aspects 1-9, wherein the cable holder module is a first type of cable holder module and the drop cable is a first type of drop cable, and wherein the ferrule stub module and hardened connector body are configured to work with a second type of cable holder module, wherein the cable holder module of the second type is configured to receive a second type of drop cable, the second type of drop cable having different characteristics, such as different diameters and/or different transverse cross-sectional shapes, than the first type of drop cable.

Aspect 11. A method of terminating optical cables, the method comprising:
  determining a size and shape of an optical cable;
  selecting a cable holder module configured to receive an optical cable having the determined size and shape;
  anchoring the optical cable to the selected cable holder module;
  splicing a fiber of the optical cable to an optical stub fiber that is affixed to a ferrule stub module that pre-compresses a spring biasing the optical stub fiber away from the cable holder module; and mounting a hardened connector body around the cable holder module, the ferrule stub module, and the optical splice.

Aspect 12. The method of aspect 11, further comprising mounting a protection module around the optical splice; and mounting the protection module within the hardened connector body.

Aspect 13. The method of aspect 12, further comprising mounting the protection module to the cable holder module.

Aspect 14. The method of aspect 11, wherein mounting a hardened connector body comprises snapping pieces of an inner body around the cable holder module and the ferrule stub module to assemble the inner body; and mounting an outer connector body about the assembled inner body.

Aspect 15. The method of aspect 14, wherein mounting an outer connector body about the assembled inner body comprises sliding the outer connector body over the assembled inner body until the inner body snap-fits to the outer connector body.

Aspect 16. The method of any of aspects 11-15, wherein the optical cable is a flat cable.

Aspect 17. The method of any of aspects 11-15, wherein the optical cable is a round cable.

The invention claimed is:

1. A modular hardened optical fiber connector, comprising:
   a ferrule stub module which comprises a pre-installed optical fiber;
   an optical cable holding module which comprises an optical drop fiber of an optical drop cable;
   an optical fiber protection module which is arranged around a connection portion between the pre-installed optical fiber and the optical drop fiber;
   an inner housing module which accommodates the ferrule stub module, the optical cable holding module and the optical fiber protection module therein, the inner housing module defining a first fixation region at which the ferrule stub module is axially fixed to the inner housing module and a second fixation region at which the cable holding module is axially fixed to the inner housing module, the second fixation region being disposed at an opposite end of the inner housing module from the first fixation region; and
   an outer housing module which accommodates the inner housing module therein.

2. The hardened optical fiber connector according to claim 1, wherein the ferrule stub module comprises a hollow body and a ferrule arranged in the body, and the pre-installed optical fiber is inserted and bonded into a central hole of the ferrule and extends from a rear end of the ferrule out of the ferrule stub module.

3. The hardened optical fiber connector according to claim 1, wherein the optical cable holding module comprises an optical cable holder for holding an end of the optical drop cable, and a heat shrink sleeve enclosing a connection portion between the optical cable holder and the optical drop cable.

4. The hardened optical fiber connector according to claim 3, wherein the optical cable holder is a cylinder with a bottom portion at one end, which includes an inner chamber for accommodating the end of the optical drop cable and a hole at the bottom of the cylinder for passing through the optical drop fiber.

5. The hardened optical fiber connector according to claim 4, wherein a gap between the hole and the optical drop fiber is filled with an adhesive, so as to fix the optical drop fiber with the optical cable holder.

6. The hardened optical fiber connector according to claim 4, wherein a rear portion of the inner chamber accommodates a sheath of the optical drop cable, and an adhesive is filled therebetween, so as to fix the sheath of the optical drop cable with the optical cable holder.

7. The hardened optical fiber connector according to claim 6, wherein a front portion of the inner chamber accommodates reinforcements of the optical drop cable and an adhesive is filled therebetween, so as to fix the reinforcements of the optical drop cable with the optical cable holder.

8. The hardened optical fiber connector according to claim 7, wherein an intermediate portion of the inner chamber is located between the rear and front portions and accommodates a fiber sheath and/or fiber sleeve of the optical drop cable and an adhesive is filled therebetween, so as to fix the fiber sheath and/or fiber sleeve of the optical drop cable with the optical cable holder.

9. The hardened optical fiber connector according to claim 6, wherein a front portion of the inner chamber accommodates reinforcements, fiber sheath and/or fiber sleeve of the optical drop cable and an adhesive is filled therebetween, so as to fix the reinforcements, fiber sheath and/or fiber sleeve of the optical drop cable with the optical cable holder.

10. The hardened optical fiber connector according to claim 4, wherein an outer surface of the cylinder is provided with a groove to receive an O-ring for achieving water-proof sealing between the optical cable holding module and the outer housing module.

11. The hardened optical fiber connector according to claim 4, wherein the heat shrink sleeve is heated to shrink on a peripheral wall of the cylinder of the optical cable holder and a sheath of the optical drop cable to provide sealing between the optical cable holder and the optical drop cable.

12. The hardened optical fiber connector according to claim 1, wherein the pre-installed optical fiber of the ferrule stub module and the optical drop fiber of the optical cable holding module are connected together by means of splicing or mechanical joining.

13. The hardened optical fiber connector according to claim 1, wherein the optical fiber protection module comprises a protective sleeve.

14. The hardened optical fiber connector according to claim 13, wherein the protective sleeve comprises a bonded tube, a reinforcement and a heat shrink sleeve from inside to outside.

15. The hardened optical fiber connector according to claim 13, wherein the protective sleeve is fixed to a projection at a front end of the optical cable holding module.

16. The hardened optical fiber connector according to claim 1, wherein the inner housing module includes an upper half shell and a lower half shell which are fit together.

17. The hardened optical fiber connector according to claim 16, wherein the upper half shell and the lower half shell are internally provided with a first upper half recess and a first lower half recess for receiving the ferrule stub module, a second upper half recess and a second lower half recess for receiving the optical cable holding module, and an upper half slot and a lower half slot for receiving the optical fiber protection module, respectively.

18. The hardened optical fiber connector according to claim 17, wherein both a longitudinal distance between closest edges of the first upper half recess and the second upper half recess of the upper half shell, and a longitudinal distance between closest edges of the first lower half recess and the second lower half recess of the lower half shell are equal to or smaller than a total length of the pre-installed optical fiber located outside the ferrule stub module and the optical drop fiber located outside the optical cable holding module.

19. The hardened optical fiber connector according to claim 16, wherein the upper half shell and the lower half shell are connected together by means of adhesive, snap fit, or positive fit.

20. The hardened optical fiber connector according to claim 19, wherein the upper half shell and the lower half shell are connected together by means of an elastic snap hook and snap recess structure.

21. The hardened optical fiber connector according to claim 16, wherein the upper half shell and the lower half shell are provided with ribs that slightly bulge from outer surfaces thereof and extend longitudinally along the outer surfaces.

22. The hardened optical fiber connector according to claim 16, wherein the upper half shell and the lower half shell have the same structures.

23. The hardened optical fiber connector according to claim 1, wherein the outer housing module includes an outer house accommodating the inner housing module, a nut installed around the outer house onto the outer house, a shroud in threaded connection with the nut, and a stress relief boot connected to a rear part of the outer house.

24. The hardened optical fiber connector according to claim 23, wherein a hole is formed at a front part of the outer house; protrusions are provided at front parts of an upper half shell and a lower half shell of the inner housing module; and the hole of the outer house cooperates with the protrusions of the upper half shell and the lower half shell to fix the inner housing module to the outer housing module.

25. The hardened optical fiber connector according to claim 24, wherein a first slope portion is provided at a rear part of an inner surface of the outer house, and second slope portions in contact cooperation with the first slop portion are provided at rear ends of the upper half shell and the lower half shell.

26. The hardened optical fiber connector according to claim 23, wherein the nut is configured to connect the outer housing module to an external network device during use of the hardened optical fiber connector.

27. The hardened optical fiber connector according to claim 23, wherein a front end of the stress relief boot is sleeved on the outer house, and a rear end thereof is sleeved on a sheath of the optical drop cable, to protect a connection portion between the outer housing module and the optical drop cable.

28. The hardened optical fiber connector of claim 1, wherein the optical drop fiber is one of a flat optical cable, a round optical cable and a bow-type optical cable.

29. A method for assembling the hardened optical fiber connector of claim 1, the method comprising:
providing the ferrule stub module comprising the pre-installed optical fiber;
providing the optical cable holding module comprising the optical drop fiber of the optical drop cable;
connecting the pre-installed optical fiber of the ferrule stub module and the optical drop fiber of the optical cable holding module together;
providing the optical fiber protection module around the connection portion between the pre-installed optical fiber and the optical drop fiber;
placing the ferrule stub module, the optical fiber protection module and the optical cable holding module into an inner housing module; and
placing the inner housing module into an outer housing module.

30. A modular hardened optical fiber connector, comprising:
a ferrule stub module which comprises a pre-installed optical fiber;
an optical cable holding module which comprises an optical drop fiber of an optical drop cable, wherein the optical cable holding module comprises an optical cable holder for holding an end of the optical drop cable, and a heat shrink sleeve enclosing a connection portion between the optical cable holder and the optical drop cable, wherein the optical cable holder is a cylinder with a bottom portion at one end, which includes an inner chamber for accommodating the end of the optical drop cable and a hole at the bottom of the cylinder for passing through the optical drop fiber, wherein a rear portion of the inner chamber accommodates a sheath of the optical drop cable, and an adhesive is filled therebetween, so as to fix the sheath of the optical drop cable with the optical cable holder;
an optical fiber protection module which is arranged around a connection portion between the pre-installed optical fiber and the optical drop fiber;
an inner housing module which accommodates the ferrule stub module, the optical cable holding module and the optical fiber protection module therein; and
an outer housing module which accommodates the inner housing module therein.

31. A modular hardened optical fiber connector, comprising:
a ferrule stub module which comprises a pre-installed optical fiber;
an optical cable holding module which comprises an optical drop fiber of an optical drop cable, wherein the optical cable holding module comprises an optical cable holder for holding an end of the optical drop cable, and a heat shrink sleeve enclosing a connection portion between the optical cable holder and the optical drop cable, wherein the optical cable holder is a cylinder with a bottom portion at one end, which includes an inner chamber for accommodating the end of the optical drop cable and a hole at the bottom of the cylinder for passing through the optical drop fiber;
an optical fiber protection module which is arranged around a connection portion between the pre-installed optical fiber and the optical drop fiber;
an inner housing module which accommodates the ferrule stub module, the optical cable holding module and the optical fiber protection module therein; and
an outer housing module which accommodates the inner housing module therein, wherein an outer surface of the cylinder is provided with a groove to receive an O-ring, for achieving water-proof sealing between the optical cable holding module and the outer housing module.

32. A modular hardened optical fiber connector, comprising:
a ferrule stub module which comprises a pre-installed optical fiber;
an optical cable holding module which comprises an optical drop fiber of an optical drop cable;
an optical fiber protection module which is arranged around a connection portion between the pre-installed optical fiber and the optical drop fiber, wherein the optical fiber protection module comprises a protective sleeve, wherein the protective sleeve comprises a bonded tube, a reinforcement and a heat shrink sleeve from inside to outside;

an inner housing module which accommodates the ferrule stub module, the optical cable holding module and the optical fiber protection module therein; and an outer housing module which accommodates the inner housing module therein.

33. A modular hardened optical fiber connector, comprising:

a ferrule stub module which comprises a pre-installed optical fiber;

an optical cable holding module which comprises an optical drop fiber of an optical drop cable;

an optical fiber protection module which is arranged around a connection portion between the pre-installed optical fiber and the optical drop fiber;

an inner housing module which accommodates the ferrule stub module, the optical cable holding module and the optical fiber protection module therein; and an outer housing module which accommodates the inner housing module therein, wherein the outer housing module includes an outer house accommodating the inner housing module, a nut installed around the outer house onto the outer house, a shroud in threaded connection with the nut, and a stress relief boot connected to a rear part of the outer house.

* * * * *